(12) United States Patent
Akiyama et al.

(10) Patent No.: US 8,942,388 B2
(45) Date of Patent: Jan. 27, 2015

(54) MODULATION DEVICE AND DEMODULATION DEVICE

(75) Inventors: Hitoshi Akiyama, Hamamatsu (JP); Shinya Koseki, Fukuroi (JP); Fukutaro Okuyama, Hamamatsu (JP); Takuro Sone, Hamamatsu (JP); Hiroyuki Iwase, Hamamatsu (JP)

(73) Assignee: Yamaha Corporation (JP)

( * ) Notice: Subject to any disclaimer, the term of this patent is extended or adjusted under 35 U.S.C. 154(b) by 501 days.

(21) Appl. No.: 13/058,174

(22) PCT Filed: Aug. 7, 2009

(86) PCT No.: PCT/JP2009/064057
§ 371 (c)(1),
(2), (4) Date: Feb. 8, 2011

(87) PCT Pub. No.: WO2010/016589
PCT Pub. Date: Feb. 11, 2010

(65) Prior Publication Data
US 2011/0150240 A1  Jun. 23, 2011

(30) Foreign Application Priority Data

| Aug. 8, 2008 | (JP) | 2008-205861 |
|---|---|---|
| Sep. 25, 2008 | (JP) | 2008-246631 |
| May 12, 2009 | (JP) | 2009-115080 |
| May 29, 2009 | (JP) | 2009-130749 |
| Jul. 21, 2009 | (JP) | 2009-170618 |

(51) Int. Cl.
*H03G 5/00* (2006.01)
*H04B 11/00* (2006.01)
*H04B 1/7075* (2011.01)

(52) U.S. Cl.
CPC .............. *H04B 11/00* (2013.01); *H04B 1/7075* (2013.01)

USPC .............. 381/98; 375/130; 375/146; 375/147

(58) Field of Classification Search
USPC ......... 375/130, 146, 147, 149, 143, 367, 152; 381/98; 700/94
See application file for complete search history.

(56) References Cited

U.S. PATENT DOCUMENTS 5,319,735 A * 6/1994 Preuss et al. ................... 704/205
5,539,705 A   7/1996 Akerman et al.
(Continued)

FOREIGN PATENT DOCUMENTS

EP  0 713 335 A2  5/1996
EP  0 872 995 A2  10/1998
(Continued)

OTHER PUBLICATIONS

International Search Report issued in corresponding PCT/JP2009/064057 mailed Sep. 8, 2009.

(Continued)

*Primary Examiner* — Joseph Saunders, Jr.
*Assistant Examiner* — James Mooney
(74) *Attorney, Agent, or Firm* — Rossi, Kimms & McDowell LLP

(57) ABSTRACT

A modulation device includes: a spread code generation unit which generates a spread code having a predetermined cycle; an audio signal input unit to which an audio signal is input; a first modulation unit which phase-modulates the spread code in each cycle on the basis of a data code; and a combining unit which combines the audio signal with a modulation signal which has been generated on the basis of the phase-modulated spread code and distributed in a frequency range higher than a predetermined frequency to output a combined signal.

20 Claims, 26 Drawing Sheets

(56) References Cited

U.S. PATENT DOCUMENTS

| | | | |
|---|---|---|---|
| 5,822,360 A * | 10/1998 | Lee et al. | 375/140 |
| 6,125,172 A | 9/2000 | August et al. | |
| 6,154,482 A * | 11/2000 | Inuzuka | 375/130 |
| 6,741,636 B1 * | 5/2004 | Lender | 375/146 |
| 6,947,893 B1 | 9/2005 | Iwaki et al. | |
| 6,985,782 B1 | 1/2006 | Watanabe | |
| 7,460,991 B2 | 12/2008 | Jones et al. | |
| 7,505,823 B1 | 3/2009 | Bartlett et al. | |
| 7,562,392 B1 | 7/2009 | Rhoads et al. | |
| 7,567,686 B2 | 7/2009 | Rhoads | |
| 7,587,601 B2 | 9/2009 | Levy et al. | |
| 7,796,978 B2 | 9/2010 | Jones et al. | |
| 8,023,692 B2 | 9/2011 | Rhoads | |
| 8,027,663 B2 | 9/2011 | Rhoads | |
| 8,094,949 B1 | 1/2012 | Rhoads | |
| 8,428,756 B2 * | 4/2013 | Matsuoka | 700/94 |
| 2003/0212549 A1 | 11/2003 | Steentra et al. | |
| 2004/0031856 A1 | 2/2004 | Atsmon et al. | |
| 2004/0137929 A1 | 7/2004 | Jones et al. | |
| 2005/0219068 A1 | 10/2005 | Jones et al. | |
| 2006/0020467 A1 | 1/2006 | Iwaki et al. | |
| 2006/0136544 A1 | 6/2006 | Atsmon et al. | |
| 2006/0153390 A1 | 7/2006 | Iwaki et al. | |
| 2006/0291539 A1 * | 12/2006 | Tischler et al. | 375/146 |
| 2007/0064957 A1 | 3/2007 | Pages | |
| 2007/0087776 A1 | 4/2007 | Terada et al. | |
| 2007/0160231 A1 * | 7/2007 | Akiyama et al. | 381/98 |
| 2008/0019424 A1 * | 1/2008 | Green et al. | 375/146 |
| 2008/0071537 A1 | 3/2008 | Tamir et al. | |
| 2008/0098225 A1 | 4/2008 | Baysinger | |
| 2008/0243491 A1 | 10/2008 | Matsuoka | |
| 2008/0262928 A1 | 10/2008 | Michaelis | |
| 2009/0067292 A1 | 3/2009 | Matsuoka | |
| 2009/0070104 A1 | 3/2009 | Jones et al. | |
| 2009/0157406 A1 | 6/2009 | Iwaki et al. | |
| 2010/0182876 A1 | 7/2010 | Matsuoka et al. | |
| 2010/0222026 A1 | 9/2010 | Dragt | |
| 2010/0222041 A1 | 9/2010 | Dragt | |
| 2010/0223145 A1 | 9/2010 | Dragt | |
| 2010/0240297 A1 | 9/2010 | Jones et al. | |
| 2011/0028160 A1 | 2/2011 | Roeding et al. | |
| 2011/0029359 A1 | 2/2011 | Roeding et al. | |
| 2011/0029362 A1 | 2/2011 | Roeding et al. | |
| 2011/0029364 A1 | 2/2011 | Roeding et al. | |
| 2011/0029370 A1 | 2/2011 | Roeding et al. | |

FOREIGN PATENT DOCUMENTS

| | | | |
|---|---|---|---|
| EP | 1205045 A1 * | 5/2002 | |
| JP | 62-183894 U | 5/1986 | |
| JP | 61-235908 A | 10/1986 | |
| JP | 62-216462 A | 9/1987 | |
| JP | 11-45474 A | 2/1992 | |
| JP | 07-169142 A | 7/1995 | |
| JP | 2000-156049 A | 6/2000 | |
| JP | 2001-148670 A | 5/2001 | |
| JP | 2002-015522 A | 1/2002 | |
| JP | 3307217 B | 7/2002 | |
| JP | 2003-506918 A | 2/2003 | |
| JP | 2004-034250 A | 2/2004 | |
| JP | 2005-010621 A | 1/2005 | |
| JP | 3752261 B2 | 3/2006 | |
| JP | 2006-098717 A | 4/2006 | |
| JP | 2006-251676 A | 9/2006 | |
| JP | 2007-104598 A | 4/2007 | |
| JP | 2007088618 A | 4/2007 | |
| JP | 2007178675 A | 7/2007 | |
| WO | 02/45286 A2 | 6/2002 | |
| WO | WO2007007666 * | 1/2007 | |
| WO | 2011014292 A1 | 2/2011 | |

OTHER PUBLICATIONS

Japanese Office Action cited in Japanese counterpart application No. JP2009-130749, dated Aug. 20, 2013. English translation provided.

Chinese Office Action cited in Chinese counterpart application No. CN200980103769.3, dated Aug. 7, 2013. English translation provided. References cited in the Office Action are not being provided because the U.S. counterparts have already been cited.

JP Office Action issued Feb. 26, 2013 for corres. JP 2009-130749.

JP OA issued Apr. 9, 2013 for corres. JP 2009-170618.

* cited by examiner

FIG.1 (A)
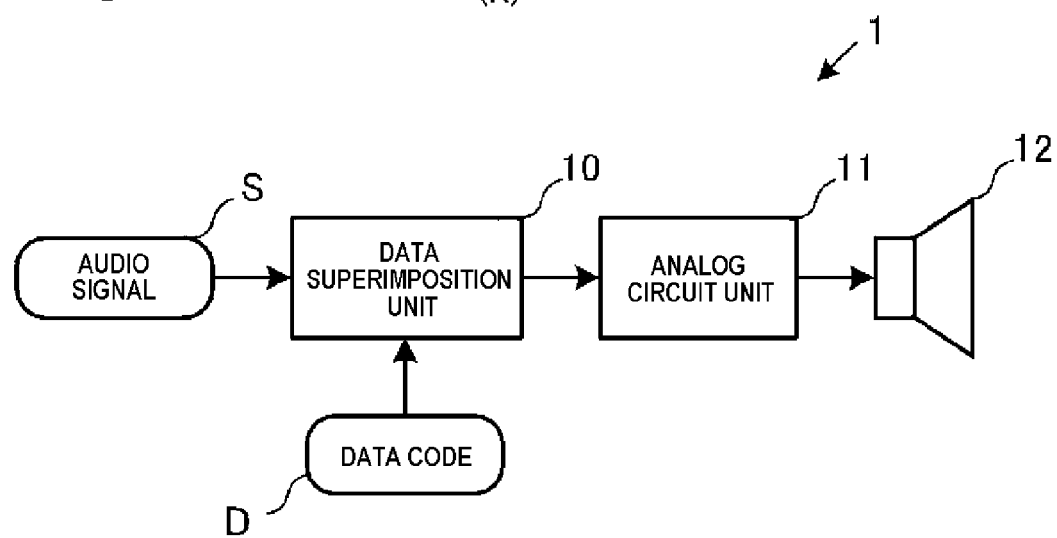
(B)
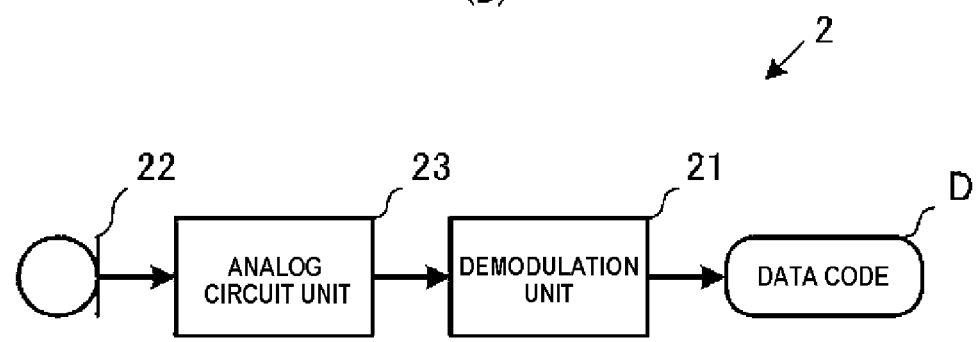

FIG.6
(A)
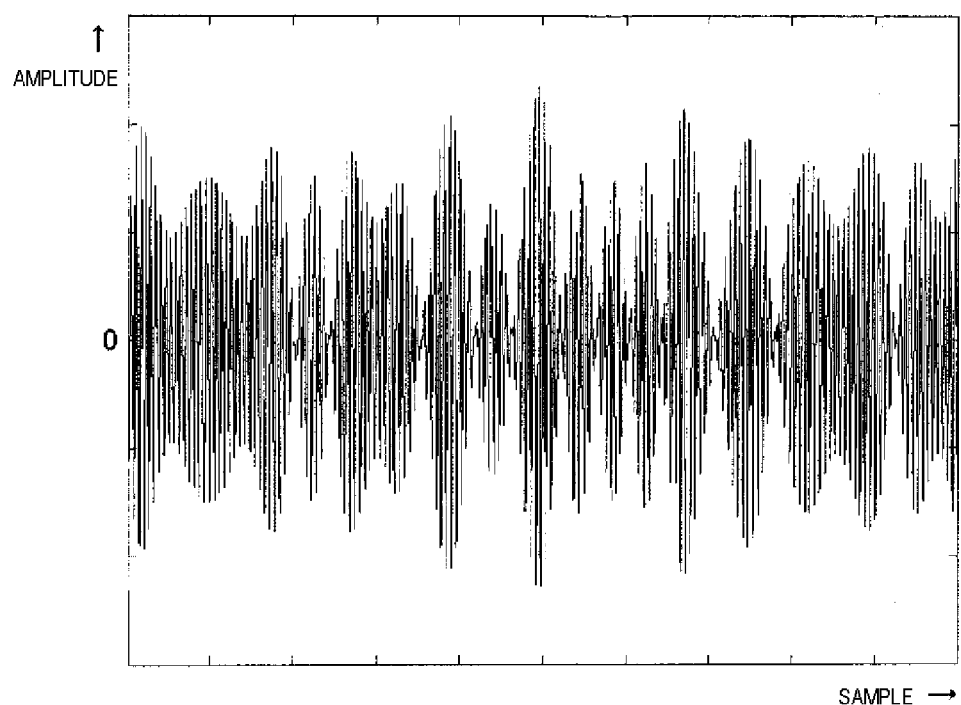
(B)
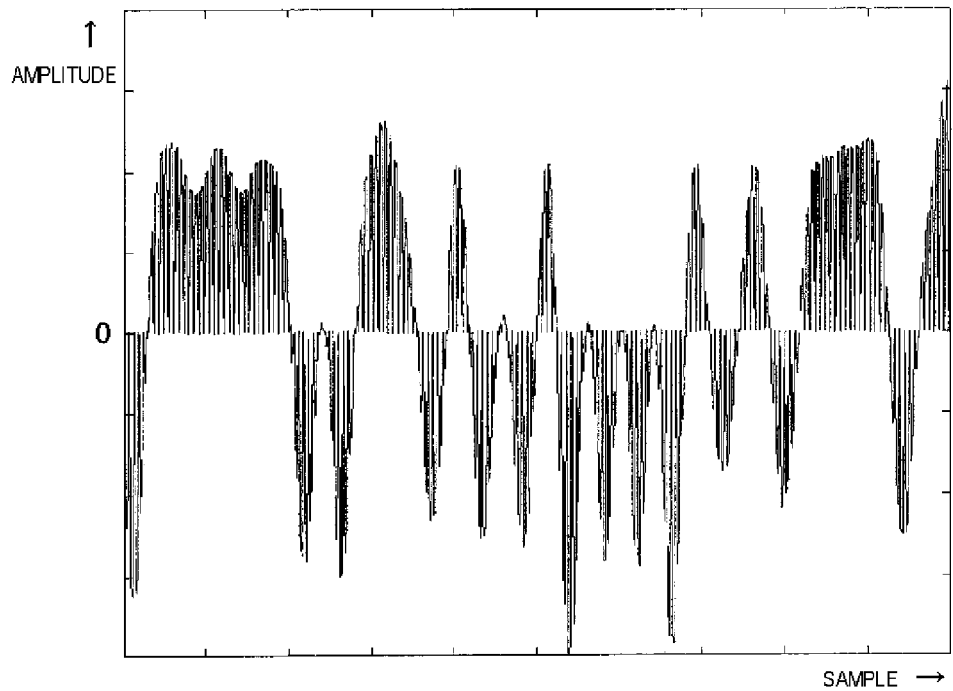

FIG.7
(A)
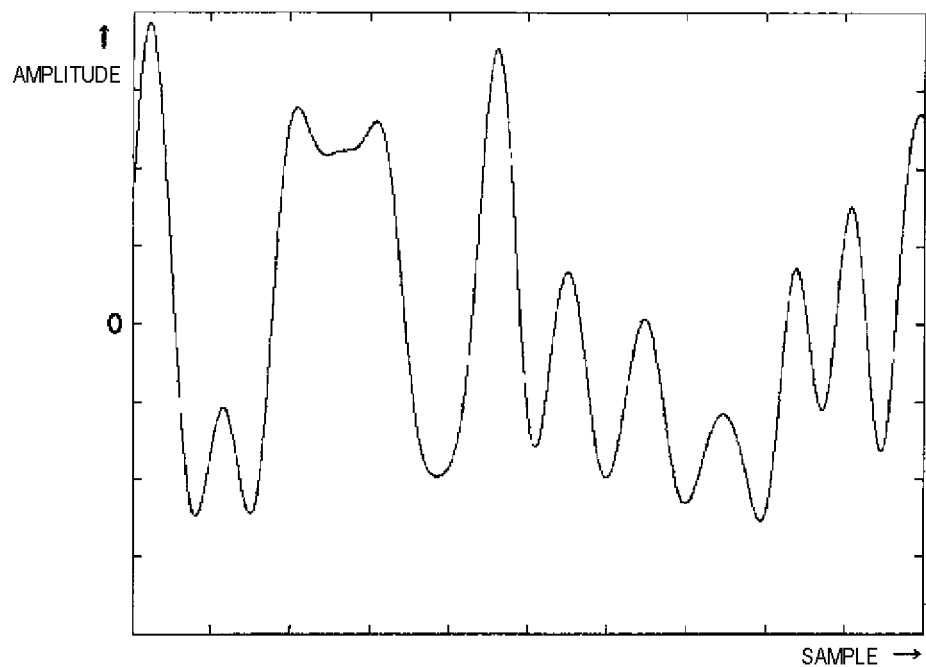
(B)
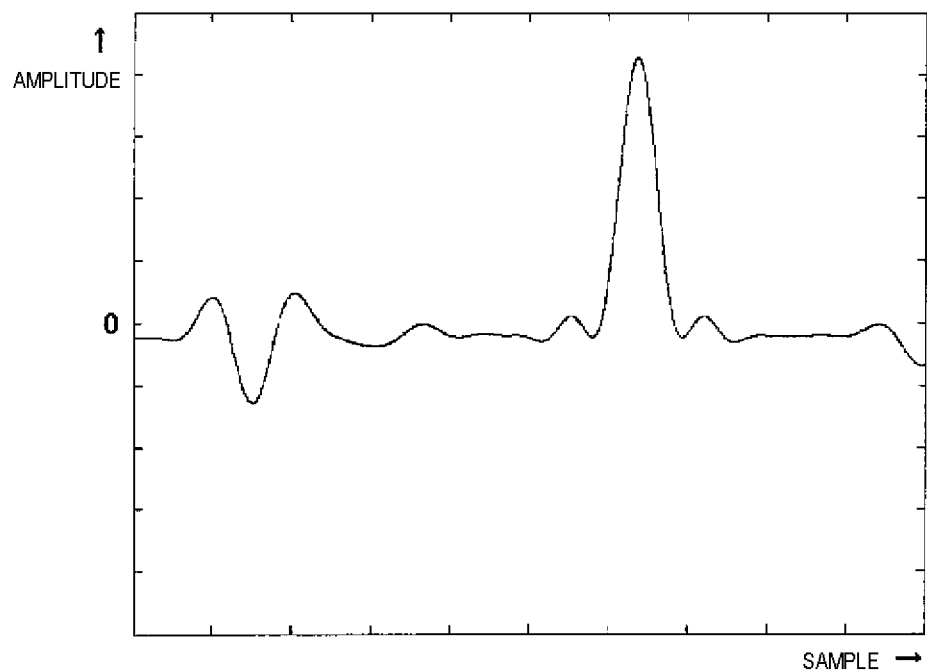

FIG.11
(A)
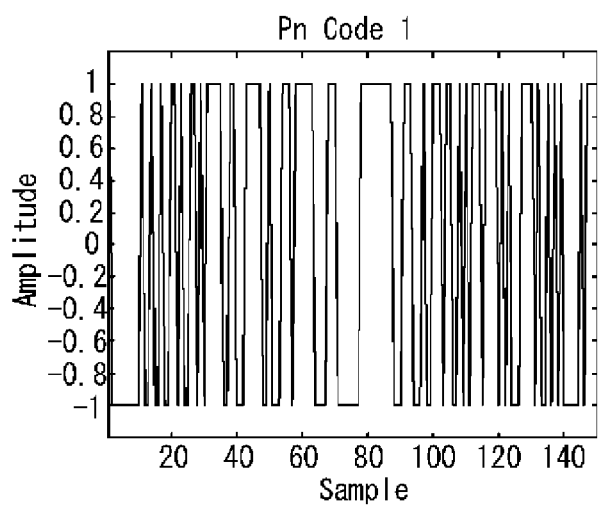
(B)
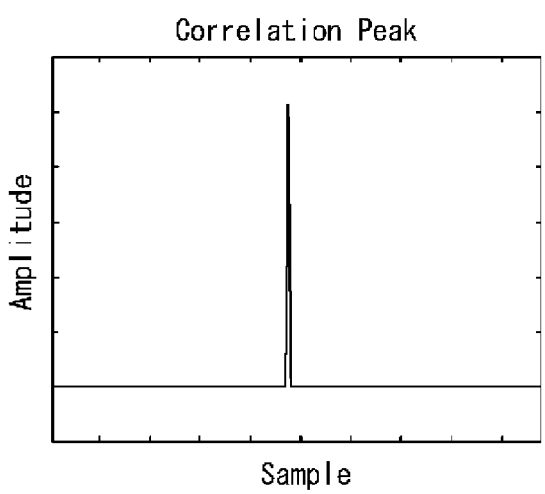
(C)
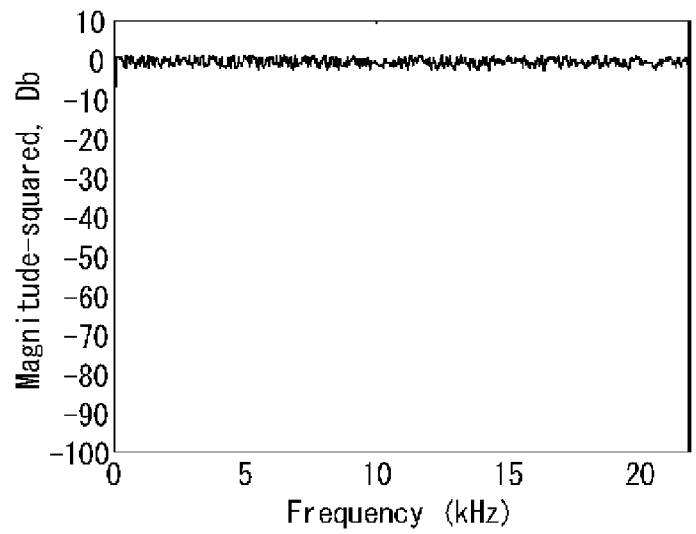

FIG.13
(A)
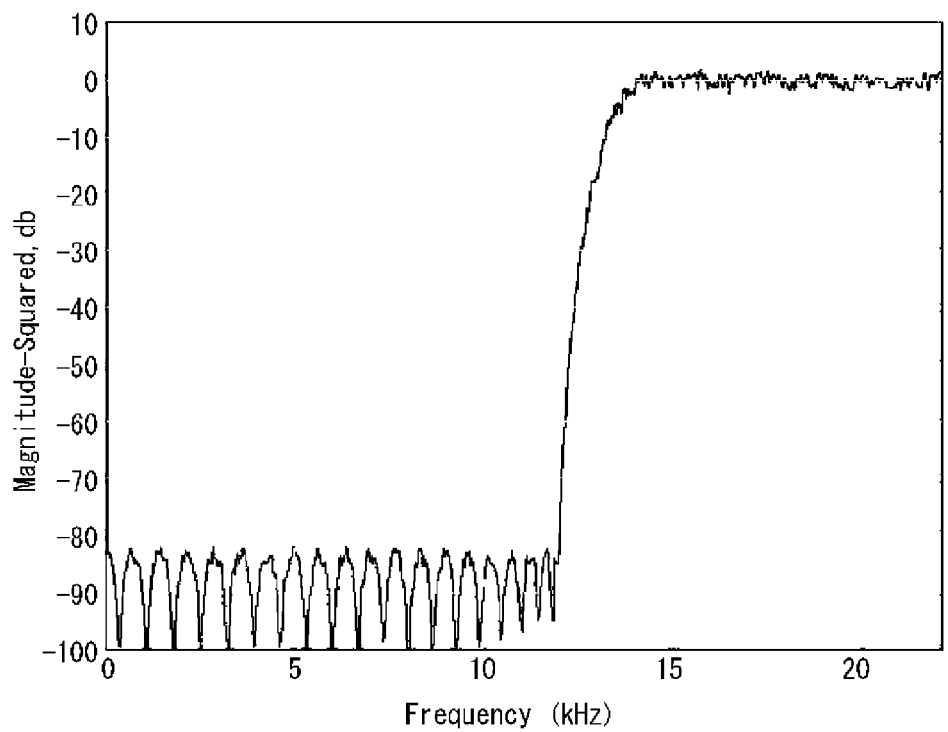
(B)
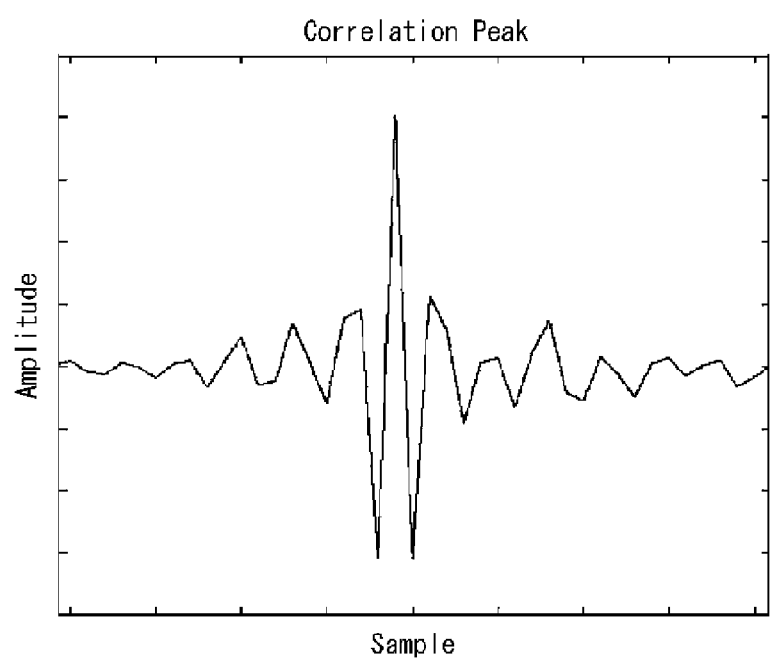

FIG.17
(A)
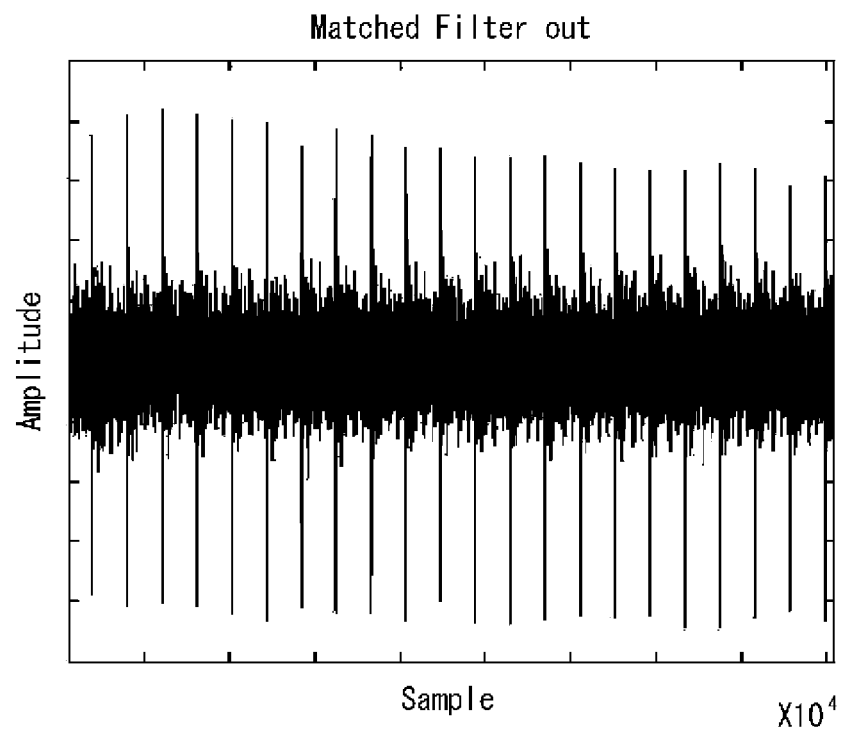
(B)
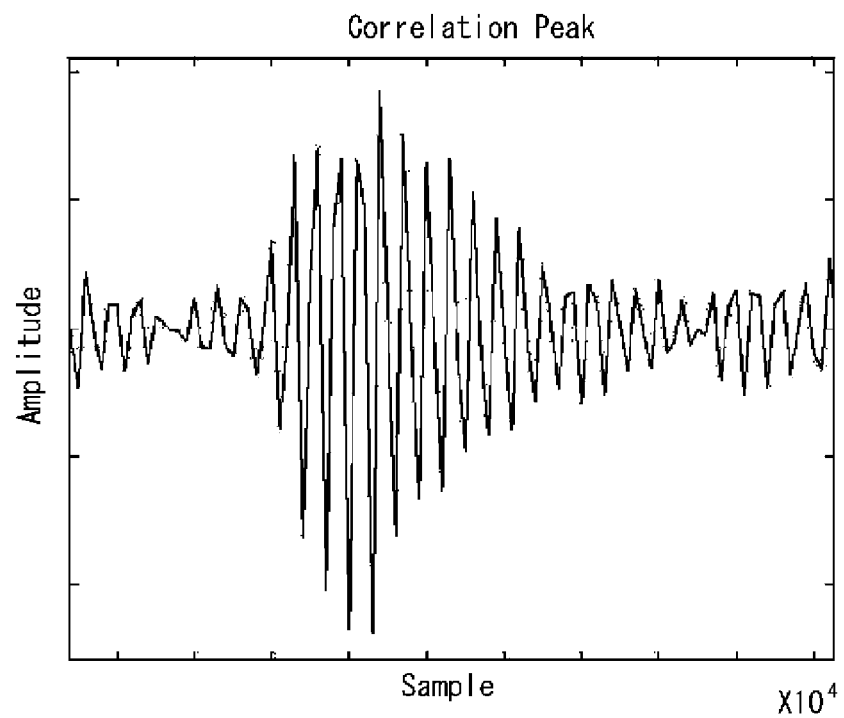

FIG.20
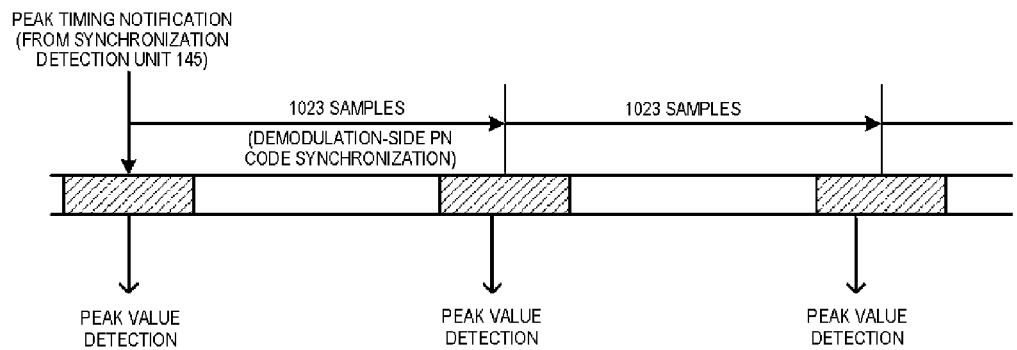
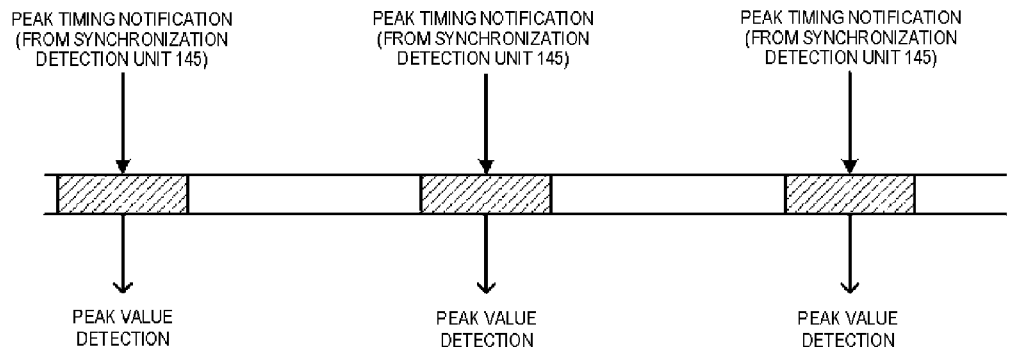

FIG.28
(A)
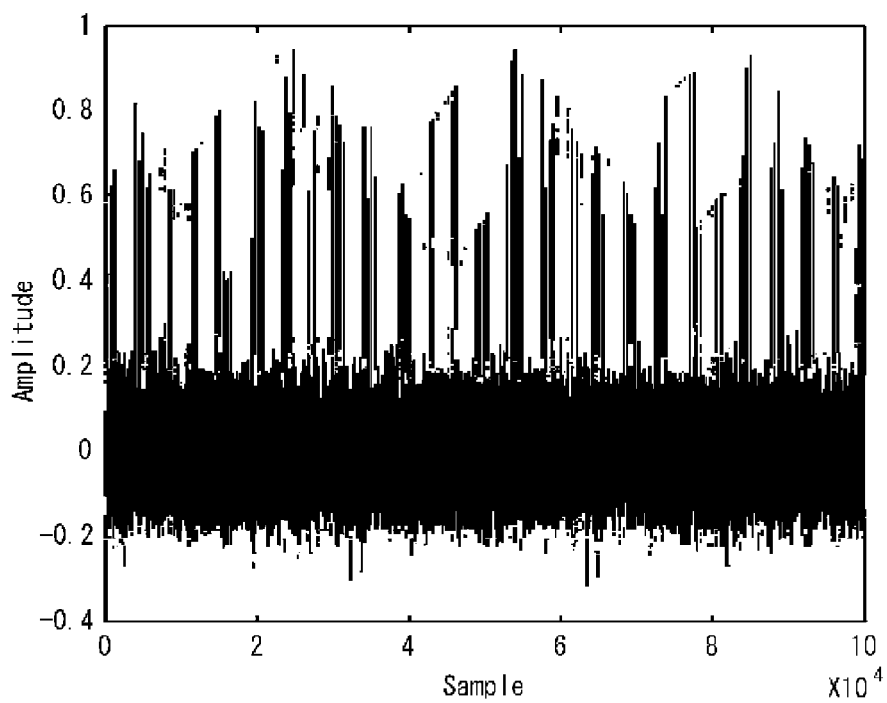
(B)
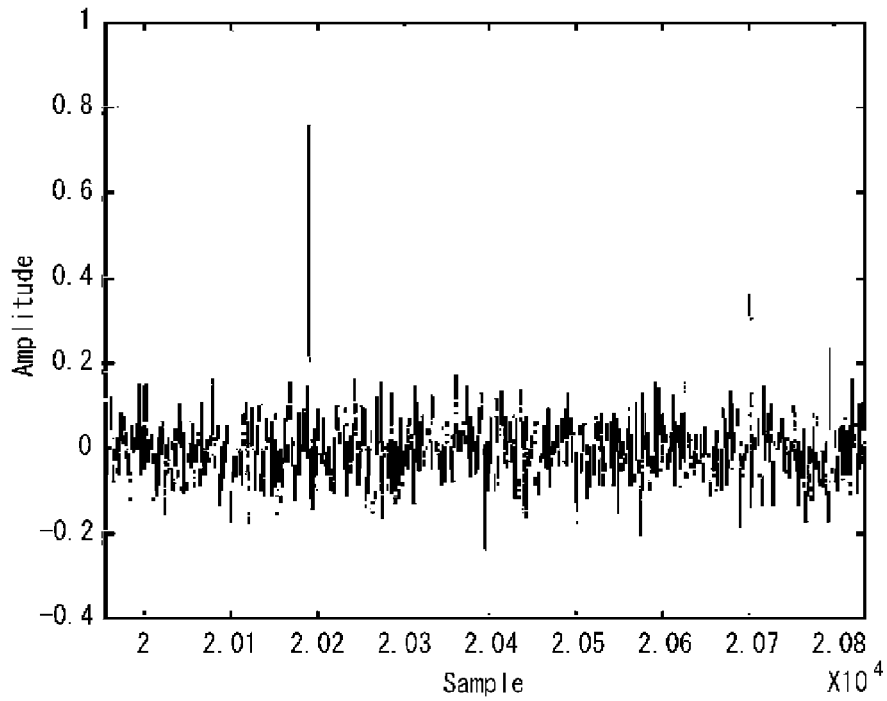

MODULATION DEVICE AND DEMODULATION DEVICE

This application is a U.S. National Phase Application of PCT International Application PCT/JP2009/064057 filed on Aug. 7, 2009 which is based on and claims priority from JP 2008-205861 filed on Aug. 8, 2008, JP 2008-246631 filed on Sep. 25, 2008, JP 2009-115080 filed May 12, 2009, JP 2009-130749 filed May 29, 2009, JP 2009-170618 filed Jul. 21, 2009 the contents of each of which are incorporated herein by reference in their entirety.

TECHNICAL FIELD

The present invention relates to a modulation device and a demodulation device mainly for transmitting codes using audio.

BACKGROUND ART

With regard to an audio communication technique for transmitting data by means of sound waves propagating through a medium, such as air, a technique is known in which a data signal undergoes spectrum spreading and is emitted as a spread signal (see Patent Literature 1). The spread signal becomes unpleasant noise to human-beings. Thus, with the technique of Patent Literature 1, the spread signal is mixed with an audio signal or the like to control such that the signal level of the spread signal is equal to or smaller than a masking threshold value.

A code transmission technique in which audio is used as a transmission medium is also described in Patent Literatures 2 and 3. Patent Literature 2 describes a method in which a carrier wave in an audible sound band is modulated with a baseband signal and the modulated signal is transmitted to be not easily heard as a masker sound. Patent Literature 3 describes a method in which amplitude modulation is used to embed an electronic watermark in an audio signal.

CITATION LIST

Patent Literature

Patent Literature 1: WO 02/45286
Patent Literature 2: JP2007-104598A
Patent Literature 3: JP2006-251676A

SUMMARY OF INVENTION

Technical Problem

In the case of audio communication, particularly, audio communication in which air is used as a medium, high-reliability communication is not easily performed due to deformation of the waveform caused by multipath or the like, absorption attenuation caused by viscosity of the medium, or the like. In order to improve the reliability of communication, it is necessary to increase the signal level of the spread signal. However, if the signal level of the spread signal increases, for example, even when the spread signal is mixed with the audio signal, the audience hears the spread signal, causing occurrence of noise and deterioration in the sound quality of the audio signal.

An object of the invention is to provide a modulation device, a demodulation device, and an audio signal reproduction apparatus for transmitting an audio signal with information while maintaining high sound quality.

Solution to Problem

A first aspect of the invention provides a modulation device, including:
a first spread code generation unit which is configured to generate a first spread code having a predetermined cycle;
an audio signal input unit to which an audio signal is input;
a first modulation unit which is configured to phase-modulate the first spread code in each cycle on the basis of data code; and
a combining unit which is configured to combine the audio signal with a modulation signal which has been generated on the basis of the phase-modulated first spread code and distributed in a frequency range higher than a predetermined frequency to output a combined signal.

A second aspect of the invention provides a demodulation device, including:
an audio signal input unit to which a combined signal is input, the combined signal being obtained by combining an audio signal with a modulation signal, which has been generated on the basis of a first spread code having a cycle phase-modulated in each cycle on the basis of a data code and has been distributed in a frequency range higher than a predetermined frequency;
a high-pass filter which is configured to cut off a frequency component equal to or lower than a cutoff frequency of the combined signal to extract a component of the modulation signal; and
a code determination unit which is configured to decode the data code combined in the audio signal on the basis of an analysis result of the extracted component of the modulation signal.

A third aspect of the invention provides a demodulation device, including:
an audio signal input unit to which an audio signal is input, the audio signal being obtained by combining a plurality of spread codes, which are synchronized with each other and have different code sequences;
a mode determination unit which is configured to determine a mode from a reference mode in which a spread code separated from the input audio signal includes a reference spread code, which is not phase-modulated by a data code, and a parallel mode in which the spread code excludes the reference spread code;
a first demodulation unit which is configured to operate in the parallel mode; and
a second demodulation unit which is configured to operate in the reference mode, wherein
the first demodulation unit detects respective correlation values of the audio signal with respect to the plurality of spread codes, and demodulates the data code on the basis of the peak of each of the correlation values, and
the second demodulation unit includes:
a first correlation detection unit which is configured to detect a first correlation value, which is a correlation value of the audio signal with respect to a spread code phase-modulated by the data code;
a second correlation detection unit which is configured to detect a second correlation value, which is a correlation value of the audio signal with respect to the reference spread code;
an addition unit which is configured to add the first correlation value and the second correlation value to output a combined correlation value;

a peak detection unit which is configured to detect a peak value of the combined correlation value in each cycle of the modulation spread code; and a code determination unit which is configured to decode the data code combined in the audio signal on the basis of the magnitude of the peak value detected by the peak value detection unit.

Advantageous Effects of Invention

According to the invention, a modulation signal generated on the basis of a phase-modulated spread code is superimposed on the high-band range of an audio signal, such that an information component can propagate along with audible sound without deteriorating sound quality.

BRIEF DESCRIPTION OF DRAWINGS

FIG. 1 shows the configuration of a transmission device and a reception device in an audio communication system according to a first embodiment of the invention.

FIG. 6 shows an output waveform example of an HPF and delay detection.

FIG. 7 shows an output waveform example of an LPF and a matched filter.

FIG. 11 shows the characteristic of a PN code.

FIG. 13 shows the characteristic of a band-limited PN code.

FIG. 17 shows a temporal change in a correlation value output from the matched filter.

FIG. 20 is a diagram illustrating a peak value detection interval.

FIG. 28 shows a temporal change in a correlation value output from a matched filter when a PN code which does not include an audio signal and is not band-limited is input.

DESCRIPTION OF EMBODIMENTS

Figure 2:
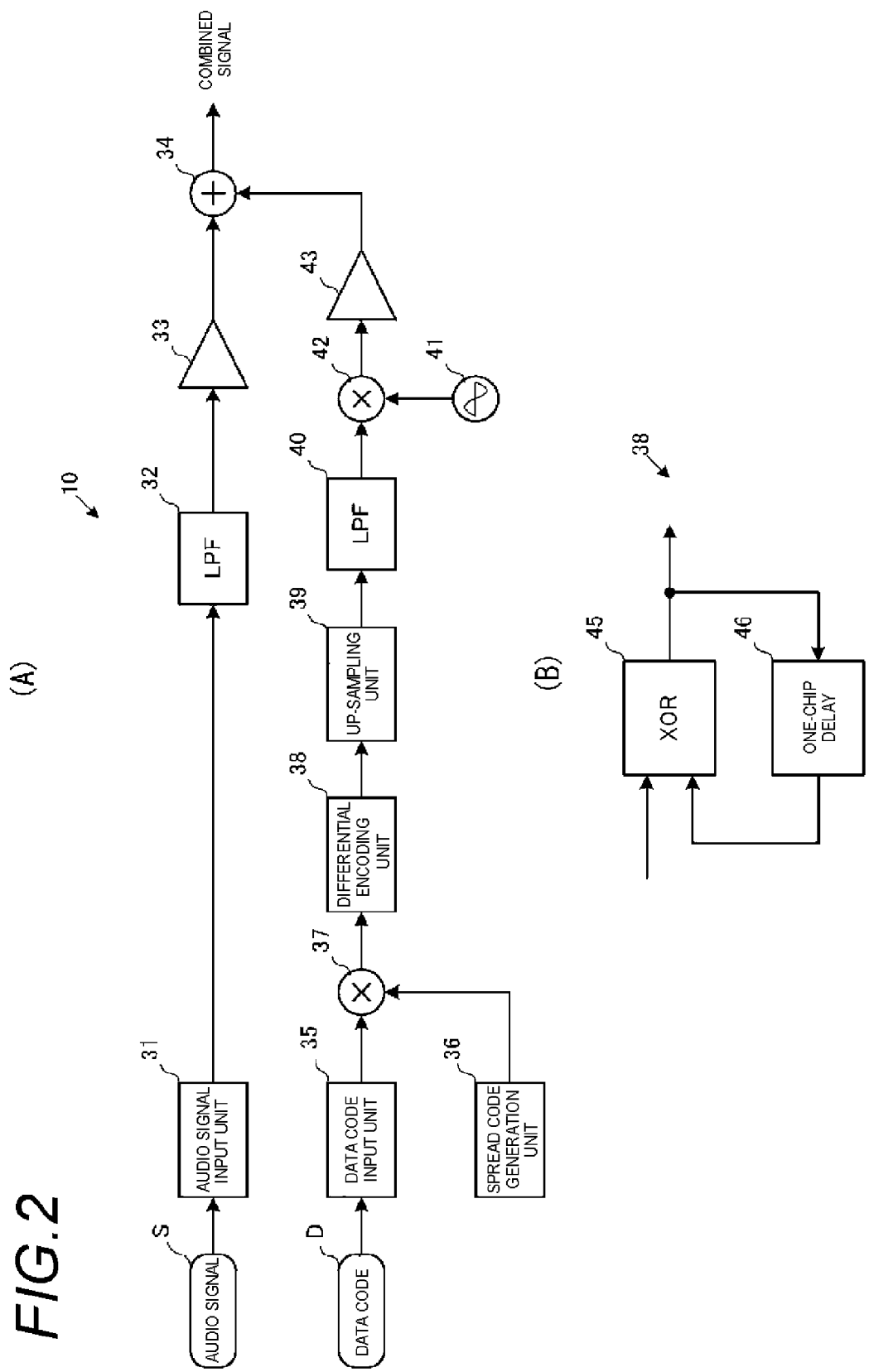
FIG. 2 shows the configuration of a data superimposition unit of the transmission device.

An audio communication method and an audio communication system according to embodiments of the invention will be described with reference to the drawings.

First Embodiment

Audio Communication System

FIG. 1 shows the configuration of an audio communication system according to a first embodiment of the invention. The audio communication system includes a transmission device 1 and a reception device 2.

The transmission device 1 has a data superimposition unit 10, an analog circuit unit 11, and a speaker 12. The data superimposition unit 10 is a circuit unit which spreads a data code D to be superimposed on the high-tone range of a digital audio signal S. The details of the configuration and operation of the data superimposition unit 10 will be described below.

The analog circuit unit 11 includes a D/A converter and an audio amplifier. The analog circuit unit 11 converts a digital combined signal output from the data superimposition unit 10 to an analog signal, amplifies the analog signal, and supplies the amplified analog signal to the speaker 12. The speaker 12 emits the combined signal input from the analog circuit unit 11 as audio. The emitted combined signal sound propagates through a space (air) and reaches a microphone 22 of the reception device 2.

The reception device 2 has a microphone 22, an analog circuit unit 23, and a demodulation unit 21. The analog circuit unit 23 has an amplifier which amplifies an audio signal collected from the microphone 22, and an A/D converter which converts the audio signal to a digital signal. The demodulation unit 21 is a circuit unit which detects a spread signal in the collected audio signal and demodulates a data code D superimposed on the spread code. The details of the configuration and operation of the demodulation unit 21 will be described below.

Data Superimposition Unit

In FIG. 2, (A) shows a configuration example of the data superimposition unit 10 of the transmission device 1. The digital audio signal S (music, voice, or the like) is input from an audio signal input unit 31 and its high band is cut off by an LPF 32. The cutoff frequency of the LPF 32 is determined on the basis of a sense of hearing and a bandwidth allocated to a modulation signal. If the cutoff frequency is excessively low, the sound quality of the audio signal S is deteriorated. Simultaneously, if the band frequency of the modulation signal is lowered in accordance with a low cutoff frequency, the modulation signal is easily noticed in the sense of hearing of a listener (loudness increases). Meanwhile, if the cutoff frequency of the LPF 32 is excessively high, the band of the modulation signal cannot be widened and the transmission quality of the data code is lowered. Thus, the cutoff frequency of the LPF 32 is determined taking into consideration of the hearing evaluation of the audio signal having passed through the LPF 32, the required bandwidth of the modulation signal, and the like.

The gain of the audio signal with the high band being cut off by the LPF 32 is regulated by a gain regulation unit 33. The audio signal S with the gain regulated is input to an adder 34. The input audio signal has a frequency component only in a mid- and low-tone range. In the case of a signal with no component in a high-tone range, the LPF 32 may be omitted.

The data code D is input to a data code input unit 35. A spread code generation unit 36 generates a spread code. A pseudorandom number code (PN code) having a fixed circulation cycle, such as an M sequence, is used as a spread code. The cycle of the data code D input from the data code input unit 35 is regulated such that one symbol cycle coincides with one circulation cycle of the spread code.

A multiplier 37 multiplies the data code D by the spread code PN. This processing is generally called spreading. With the spread processing, as the spread code PN is phase-modulated in each circulation cycle with the value (1/0) of the data code D, the frequency spectrum of the data code D is spread.

A spread code MPN modulated with the data code D by the multiplier 37 is converted to a differential code DMPN by a differential encoding unit 38. The differential encoding processing is performed for substituting the absolute value of the value of each chip of the spread code with a value representing a change from a previous chip. With the differential encoding, on a reception side (described below in detail), even when there is no clock accurately synchronized with the transmission side, it is possible to demodulate symbols with high accuracy by means of delay detection.

In FIG. 2, (B) shows an example of the differential encoding unit 38. The differential encoding unit 38 includes an XOR circuit 45 which receives the spread code MPN through one input terminal, and a one-chip delay circuit 46 which delays the output of the XOR circuit 45 by one chip and returns the delay result to the other input terminal of the XOR circuit 45. The output of the XOR circuit 45 is delayed by one chip and fed back, such that the XOR circuit 45 outputs the comparison result between the input spread code MPN and the output before one clock of the XOR circuit 45 as the differential code DMPN. That is, the absolute value of each chip of the spread code MPN is substituted with the presence or absence of a phase change from the chip of the previous differential code DMPN in the differential code DMPN. Thus, on the reception side, it is possible to restore the spread code MPN by comparing two continuous chips.

Figure 3:
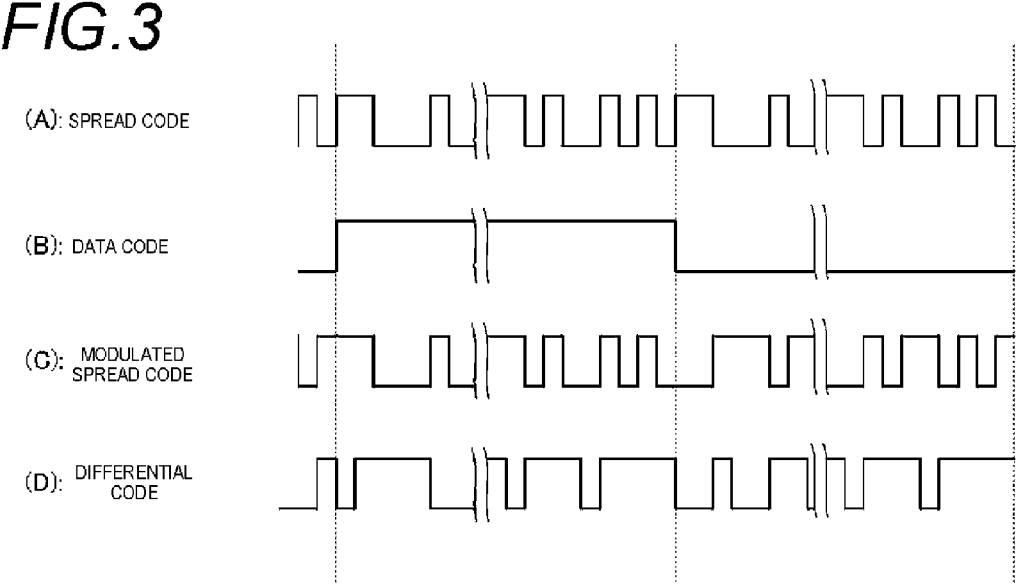
FIG. 3 shows a waveform example of spread processing and differential encoding.

FIG. 3 shows an example of the waveforms of the data code D and the spread codes PN, MPN, and DMPN. In FIG. 3, (A) shows the spread code PN generated by the spread code generation unit 36. In FIG. 3, (B) shows the data code D input from the data code input unit 35. In FIG. 3, (C) shows the spread code MPN phase-modulated in each circulation cycle with the data code D. The data code string D shown by (C) in FIG. 3 is "10", thus the phase is normal in the first cycle of the spread code MPN and the phase is inverted in the second cycle. In FIG. 3, (D) shows the code string (differential code) DMPN obtained by differentially encoding the modulated spread code MPN. The code string is based on the comparison result (exclusive-OR) between the value of each chip of the spread code MPN and the value of the differential code DMPN of a previous chip. The differential code DMPN is converted to a binary signal of −1 and 1.

The differential code DMPN which is the binarized code string is input to an up-sampling unit 39. The up-sampling unit 39 up-samples the input code string. The chip rate and bandwidth of the spread code to be transmitted (emitted) are determined on the basis of the chip rate of the spread code PN generated by the spread code generation unit 36 and an up-sampling ratio in the up-sampling unit 39.

Referring to (A) in FIG. 2, the up-sampled signal (differential code DMPN) is input to an LPF 40. The LPF 40 is a filter which limits the band of a baseband signal while suppressing inter-chip interference, and is called a Nyquist filter. The Nyquist filter has a characteristic that an impulse response rings (passes through 0) with a symbol rate, and is constituted by an FIR filter which is generally called a cosine low-pass filter. The order, the roll-off rate α, and the like of the filter are determined in accordance with an application condition or the like.

In the first embodiment, on the reception side, an LPF 54 also performs filtering. Thus, the filters are constituted by a root-raised-cosine roll-off filter, such that the LPF 40 and the LPF 54 on the reception side constitute a Nyquist filter.

A signal which is band-limited and waveform-shaped by the LPF 40 is multiplied by a carrier (carrier wave) signal in the multiplier 42 and frequency-shifted to a high-frequency band. The frequency of the carrier signal generated by a carrier signal generation unit 41 is arbitrary, and is preferably set such that the band of the frequency-shifted spread code is equal to or higher than the cutoff frequency of the LPF 32 and falls within the operable frequency band of an acoustic instrument, such as a speaker, a microphone, or the like and the encoding frequency band of a digital signal processing unit (CODEC) including signal compression.

That is, if the frequency of the carrier signal is lowered, a modulation signal component may be easily noticed in the sense of hearing and an audio signal may be mixed in the modulation signal, deteriorating transmission quality. If the frequency of the carrier signal is excessively high, transmission quality may be degraded due to deterioration in the high-frequency band characteristic of the speaker, the microphone, or the like, or waveform distortion out of the encoding frequency band of the CODEC. When the modulation signal band exceeds the Nyquist frequency, aliasing distortion may be combined.

That is, it is assumed that the bandwidth (chip rate) of the spread signal and the frequency of the carrier signal satisfy the following condition. Where the bandwidth of the up-sampled modulation signal is fBW, the sampling frequency is fs, the cutoff frequency of the LPF 32 is fc, and the frequency of the carrier signal is fa, it is necessary that the following condition is satisfied.

$$\frac{\frac{fs}{2} - fc}{2} \geq fBW \qquad \text{[Equation 1]}$$

$$fc \leq fa - fBW$$

$$\frac{fs}{2} \geq fa + fBW$$

A modulation signal MDMPN which is frequency-shifted to the high-frequency band is subjected to gain regulation by the gain regulation unit 43. The gain-regulated modulation signal MDMPN is added to and combined with the audio signal S in the adder 34. The combined signal is output to the outside. The gain of the gain regulation unit 43 is determined on the basis of an application environment or an allowable sound emission pressure level in the system, a required propagation distance, hearing evaluation, and the like. The gain of the gain regulation unit 43 may be adaptively controlled in accordance with the level of the audio signal S output from the LPF 32. For example, control may be performed as follows: when the level of the audio signal S is high, a masking effect can be anticipated, such that the level of the modulation signal MDMPN also increases and the gain increases with respect to noise; and when the level of the audio signal S is low, the level of the modulation signal MDMPN is lowered such that the sense of hearing of the audio signal S is not deteriorated.

Figure 4:
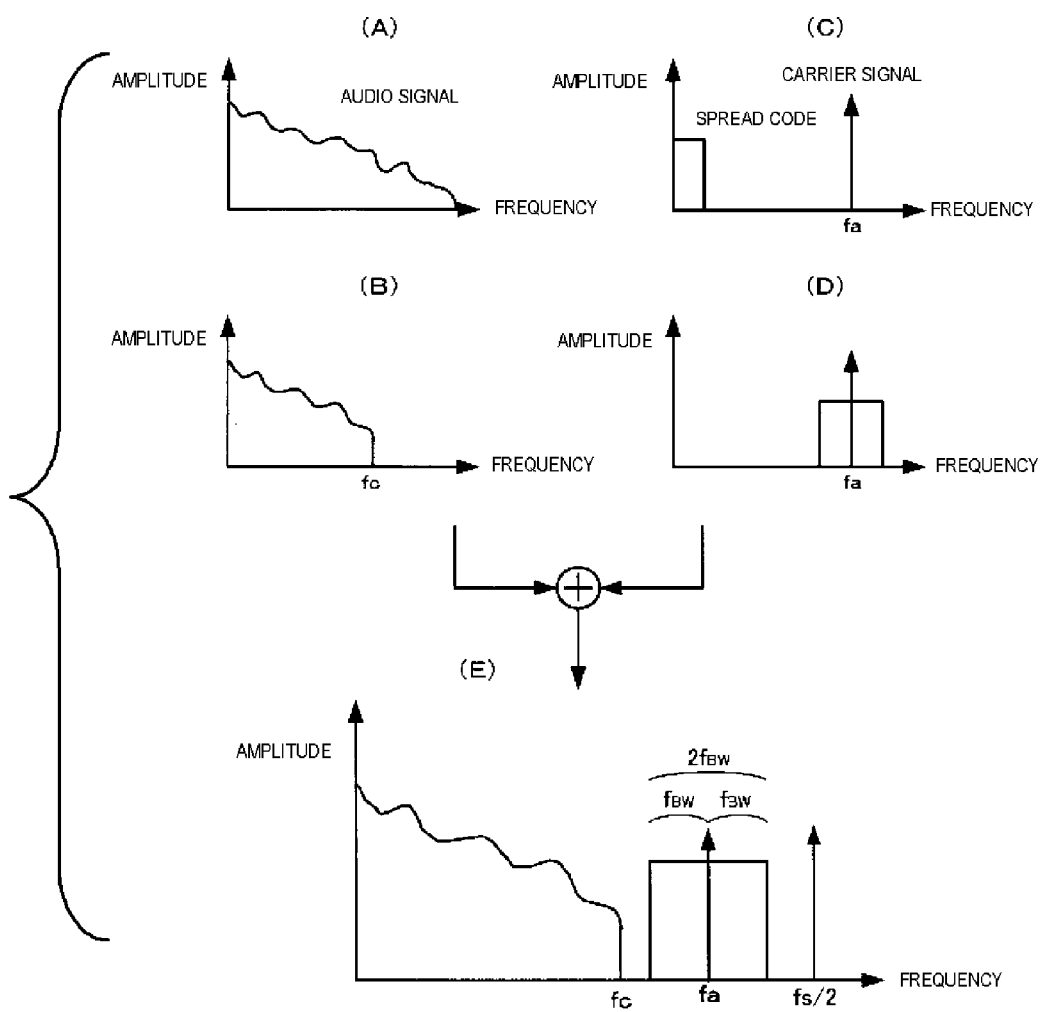
FIG. 4 shows a spectrum example of respective units of the data superimposition unit.

FIG. 4 is a diagram illustrating the summary of a frequency spectrum at each block of the data superimposition unit 10. In FIG. 4, (A) shows the frequency spectrum of the audio signal S input to the audio signal input unit 31. In FIG. 4, (B) shows the frequency spectrum of the audio signal S with the high-tone range being cut off by the LPF 32. The cutoff frequency fc of the LPF 32 is set to, for example, about ten kHz or so in accordance with the hearing characteristic of the target audience.

In FIG. 4, (C) shows the frequency spectrum of the (band-limited) differential code DMPN output from the LPF (Nyquist filter) 40 and the carrier signal (a sine wave with the frequency fa). In FIG. 4, (D) shows the modulation signal MDMPN obtained by multiplying the differential code DMPN by the carrier signal. In this example, real multiplication is done and bands (sidebands) are formed on both sides of the carrier signal.

In FIG. 4, (E) shows a combined signal output from the adder 34. The combined signal is obtained by adding and combining the audio signal S output from the gain regulation unit 33 and the modulation signal MDMPN output from the gain regulation unit 43. The combined signal is converted to an audio signal in the analog circuit unit 11 and emitted to the space from the speaker 12. The combined signal may be transmitted as an analog signal through a wired or wireless audio signal transmission path.

Demodulation Unit

Figure 5:
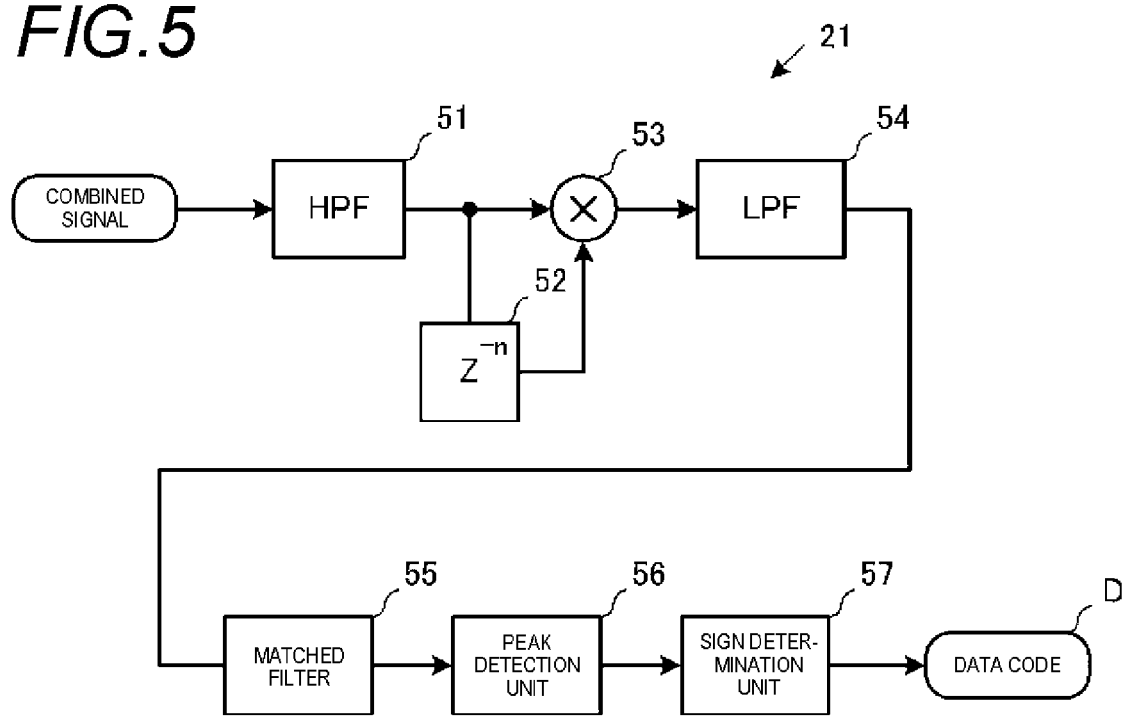
FIG. 5 shows the configuration of a demodulation unit of the reception device.

FIG. 5 shows a configuration example of the demodulation unit 21 of the reception device 2. To the demodulation unit 21 is input a combined signal which is collected in the microphone 22 and subjected to A/D conversion in the analog circuit unit 23. The input combined signal is output to an HPF 51. The HPF 51 is a filter which removes an audio signal component from the combined signal and extracts a spread signal component MDMPN frequency-shifted with the carrier signal. The cutoff frequency of the HPF 51 is set to the lower limit frequency (fa−fBW/2 (see (E) in FIG. 4)) of the modulation signal band. The modulation signal MDMPN extracted by the HPF 51 is input to a delay unit 52 and a multiplier 53. The delay time of the delay unit 52 is set to the time corresponding to one chip of the spread code up-sampled on the transmission side. For example, when N-times up-sampling is done, the delay amount of the delay unit 52 corresponds to N samples. The multiplier 53 multiplies the samples corresponding to one chip of the HPF 51 and the samples corresponding to one chip of the delay unit 52. This processing is the above-described delay detection processing. With the delay detection processing, the signal MDMPN subjected to differential encoding is converted to a signal including the original spread code MPN.

In FIG. 6, (A) shows an output waveform example of the HPF 51. In FIG. 6, (B) shows an output waveform example of the multiplier 53. Referring to the waveform of (A) in FIG. 6, the envelope of the carrier signal is in the shape of the differential code DMPN which is band-limited (deformed in a smooth waveform) in the LPF 40. Meanwhile, referring to the waveform of (B) in FIG. 6, the envelope of the carrier signal is in the shape of the spread code MPN which is modulated with the data code D.

A code waveform (decoded code waveform) which is decoded by delay detection in the delay unit 52 and the multiplier 53 shown in FIG. 6 is subjected to positive and negative inversion compared to a code waveform before differential encoding in the differential encoding unit 38 on the transmission side. Although the signal is handled as a signal subjected to positive and negative inversion without causing any problems, an inverter may be inserted as necessary.

The feature of the delay detection processing is that it is not necessary to reproduce the carrier signal at the time of demodulation. As described above, differential encoding is used on the transmission side and delay detection is used on the reception side, making it possible to construct a communication system with a small processing load securely with respect to frequency variation.

The multiplication result of the multiplier 53 is input to the LPF 54. The LPF 54 is a filter which filters a carrier component to extract a baseband signal and also filters unnecessary noise to improve an SN ratio. The LPF 54 has the same characteristic as the LPF (Nyquist filter) 40 on the transmission side. As described above, the LPF 40 of the modulation unit and the LPF 54 are filters having root characteristics to collectively obtain the complete Nyquist filter characteristics.

In FIG. 7, (A) shows an example of an output waveform of the LPF 54. The output waveform does not coincide with the waveform shown in FIG. 6 because different parts are cutout.

The output of the LPF 54 is input to a matched filter 55. The matched filter 55 is constituted by an FIR filter having the spread code PN used in spreading data code on the transmission side as a coefficient. The chip rate of the spread code used as a coefficient is the same as the chip rate after up-sampling on the transmission side. That is, the same sign of the same spread code PN is repeated by the amount corresponding to the up-sampling ratio in the matched filter 55.

The matched filter 55 (correlation detection unit) carries out a convolution operation of the output waveform of the LPF 54 shown by (A) in FIG. 7 and the spread code PN, and outputs the correlation value of the output waveform of the LPF 54 and the spread code PN. In FIG. 7, (B) shows an example of the output waveform of the matched filter 55. Interference or noise received through a transmission path has low correlation to the spread code and does not significantly affect the correlation value output from the matched filter 55. Thus, the spread processing enables transmission resistant to disturbance.

The correlation value shows a strong correlation peak in the cycle of the spread code PN, and the phase of the peak is phase-modulated by a transmission symbol, such that the positive peak and the negative peak appear to correspond to 1 and −1 of the transmission symbol. The output of the matched filter 55 is input to a peak detection unit 56. The peak detection unit 56 detects a large peak around the cycle of the spread code PN and sets the detected peak as a correlation peak. The detected correlation peak is input to a sign determination unit 57. The sign determination unit 57 decodes a symbol from a peak phase and outputs the symbol as the data code D.

With the above-described configuration, even when an audio signal is emitted to a space and transmitted with a code modulation signal superimposed thereon with little discomfort in the sense of hearing, it is possible to realize an audio transmission system having high solidity against frequency variation or interference with comparatively little processing load.

Although in the first embodiment, addition of an error correction code or the like has not been described, when error correction, interleaving, and the like is used in the transmission device, these kinds of processing may be performed for a received symbol in the reception device.

Although in the above-described embodiment, the multiplication of the carrier signal and the differential code DMPN is carried out by an operation in a real range, the carrier signal may be transformed to a complex number through Hilbert transform and the band shift of the differential code DMPN may be carried out by an operation in a complex range. In this case, the shifted modulation signal band becomes a single sideband, thus the condition represented by [Equation 1] described above is modified to [Equation 2] described below.

$$\frac{fs}{2} - fc \geq fBW$$
$$fc \leq fa$$
$$\frac{fs}{2} \geq fa + fBW$$

[Equation 2]

In the first embodiment, the data code to be transmitted spreads with the spread code. The spread code is, for example, an M-sequence pseudo noise code or the like. With the spread processing, even in the environment in which environmental sound or other audio signals exist and the SN ratio is bad, it becomes possible to transmit a data code with high reliability. The spread code is subjected to differential encoding to generate a differential code string. With the differential encoding, even when there is no clock on the reception side which is accurately synchronized with that on the transmission side, it becomes possible to demodulate the original spread code using the presence or absence of sign inversion of each chip of the code string. The differential code is frequency-shifted through modulation. With the frequency shift, the band of the differential code is shifted from a baseband to a frequency band such that the differential code can be emitted and transmitted as audio. The differential code is shifted from an audible band to a higher frequency band, making it possible to emit the differential code in a state of being mixed with an audio signal, such as musical sound. It should suffice that the high-tone range of the audio signal to be mixed is cut so as not to overlap with the modulation signal.

In general, according to the method of the invention in which information is transferred using audio (sound wave) propagating through the air, a Doppler shift due to the movement of a transmission device (speaker) or a reception device (microphone) or clock mismatching between the transmission side and the reception side occurs. In particular, since a sound wave has a propagation speed of 340 m/second which is decisively lower than that of an electric wave, for example, even when a person who carries with a reception device makes a motion, such as walking or swinging his/her arm, a significant Doppler shift may occur.

However, in this embodiment, the differential code is up-sampled, such that synchronization mismatching on the reception side can be finely absorbed in terms of chips of the up-sampled signal, and there is no case where mismatching occurs over one chip of the differential code. It also becomes possible to absorb a frequency shift, such as a Doppler shift or a clock deviation, with high accuracy.

With the above-described method, in the modulation processing and the demodulation processing, it becomes possible to carry out information transmission with high resistance to a frequency shift, such as a Doppler shift, or disturbance only with processing in the time range excluding processing in the frequency range, that is, with a small processing load.

Since no carrier signal is used so as to recover a frequency shift at the time of demodulation, it is not necessary to provide a PLL circuit or the like in the demodulation device, simplifying the configuration of the demodulation device.

In the first embodiment, a data code spreads with a white-noise-like spread code and is then transmitted. Thus, discomfort in the sense of hearing is significantly reduced compared to a single carrier method in which a sine wave to be easily heard is used, or a multi-carrier method in which phase or amplitude discontinuously changes to generate noise. A modulation signal is shifted to a high-frequency band in which hearing sensitivity of a person is made blunt and an audio signal is mixed in a mid- and low-tone range, improving discomfort in the sense of hearing.

According to this embodiment, even when a Doppler shift occurs in a data code transmitted as audio and a frequency varies, it becomes possible to carry out stable demodulation without being affected by the frequency variation.

A data code is mixed with an audio signal, making it possible to transmit information with little discomfort in the sense of hearing even when the audio signal is emitted to a space.

Second Embodiment

Figure 8:
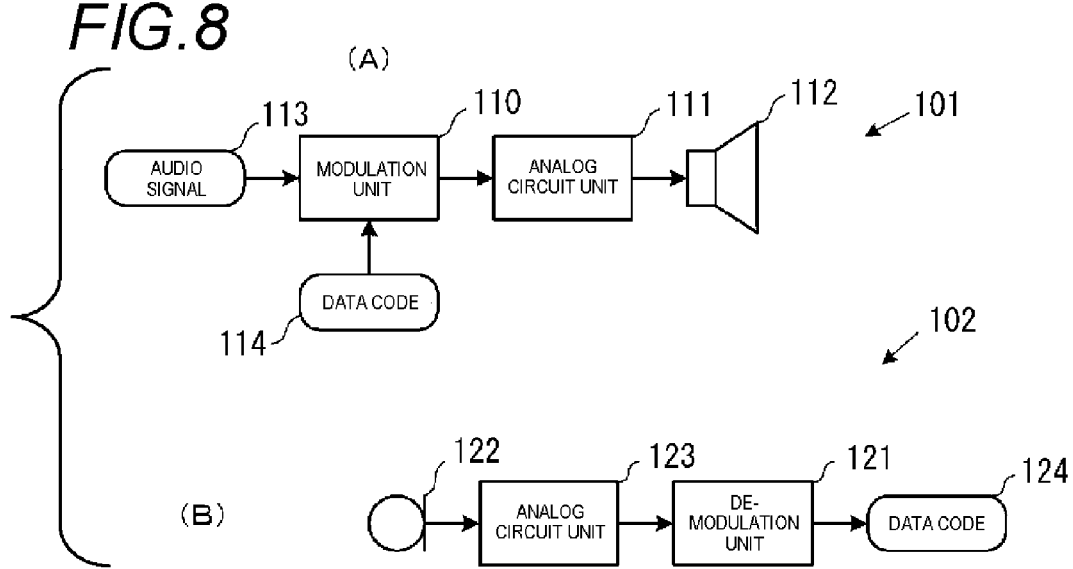
FIG. 8 is a configuration diagram of an audio communication system according to a second embodiment of the invention.

FIG. 8 shows the configuration of an audio communication system according to a second embodiment of the invention. As shown in FIG. 8, an audio communication system of the second embodiment includes a transmission device 101 and a reception device 102.

The transmission device 101 has a modulation unit 110, an analog circuit unit 111, and a speaker 112. The modulation unit 110 corresponds to a modulation device of the invention, receives an audio signal 113 which is an audible sound signal to the audience and a data code 114 to be transmitted, and generates an audio signal having a frequency distribution shown in FIG. 14. The audio signal includes a modulation pseudo noise signal (modulation PN code) and a reference pseudo noise signal (reference PN code) modulated with the audio signal 113 and the data code 114. The modulation PN code and the reference PN code are PN codes whose start/end timing is synchronized with the same length and the same chip rate. The details of the configuration and operation of the modulation unit 110 will be described below. The modulation unit 110 is constituted by a digital signal processing device, such as a DSP.

The analog circuit unit 111 includes a D/A converter and an audio amplifier. The analog circuit unit 111 converts a digital audio signal output from the modulation unit 110 to an analog signal, amplifies the analog signal, and supplies the amplified analog signal to the speaker 112. The speaker 112 emits the audio signal output from the analog circuit unit 111 as audio to the air. The above-described modulation PN code and reference PN code reach a microphone 122 of the reception device 102 through the same analog circuit unit 111, the same speaker 112, and the same transmission path.

The reception device 102 has a microphone 122, an analog circuit unit 123, and a demodulation unit 121. The analog circuit unit 123 has an amplifier which amplifies an audio signal collected by the microphone 122, and an A/D converter which converts the audio signal to a digital signal. The demodulation unit 121 corresponds to a demodulation device of the invention, and is a circuit unit which detects a PN code included in the collected audio signal and demodulates data superimposed on the PN code. The details of the configuration and operation of the demodulation unit 121 will be described below.

Description of Modulation Unit

Figure 9:
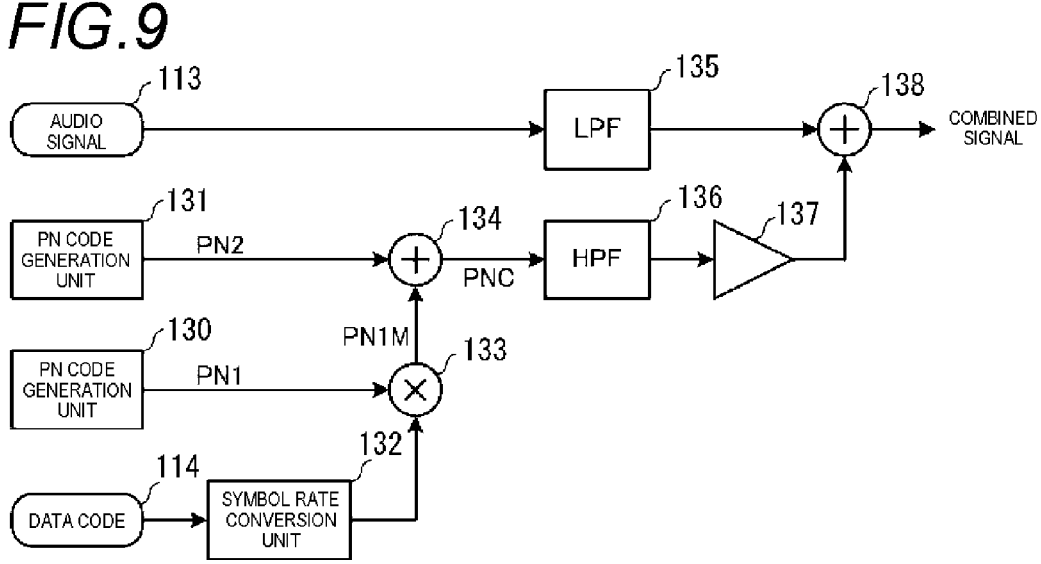
FIG. 9 shows the configuration of a transmission-side modulation unit.

FIG. 9 is a block diagram showing the configuration of the modulation unit 110. The modulation unit 110 is a functional unit which generates and outputs a combined signal obtained by combining the audio signal 113 and the two PN codes. One PN code (modulation PN code PN1M) of the two PN codes is phase-modulated with the data code 114, and the other PN code (reference PN code PN2) is a PN code which is synchronized with PN1 in the same cycle as PN1 and constantly has a positive phase.

The audio signal 113 is input to an adder 138 after the high-tone range thereof is cut by a low-pass filter (LPF) 135. The cutoff frequency of the LPF 135 is set to, for example, about 10 kHz. A frequency band which is equal to or higher than the cutoff frequency of the LPF 135 and in which the speaker 112 can emit sound is used as a frequency band for a PN code. If the cutoff frequency is extremely low, deterioration in the sense of hearing due to the PN code is noticeable, thus the cutoff frequency is set to a frequency (for example, 10 kHz) such that the sense of hearing based on a hearing experiment or the like is not damaged. When the frequency component of the audio signal 113 concentrates on a low-tone range and is not distributed in the frequency range for a PN code, the LPF 135 may be omitted.

Figure 10:
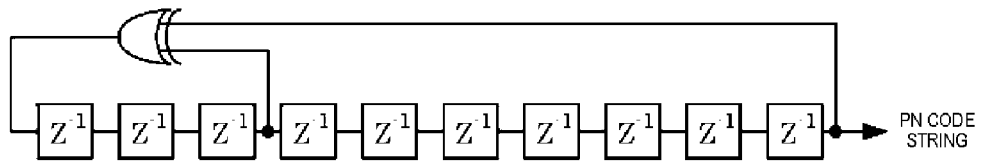
FIG. 10 shows the configuration of a PN code string generation unit.

A first PN code generation unit 130 is a functional unit which generates a PN (Pseudo Noise) code (PN1) in a predetermined cycle on the basis of an M-sequence (Maximal length sequence) polynomial. An M-sequence PN code is, for example, a one bit-sequence spread code which is generated by a linear recurrent equation (M-sequence polynomial), such as "PN1=$x^{10}+x^7+1$". If the order of the polynomial is n, a PN code in a cycle of $2^n-1$ can be generated, and the cycle of a PN code which is generated by the above-described polynomial expression is $2^{10}-1=1023$. The PN code of the above-described polynomial can be generated by a circuit shown in FIG. 10 which uses a shift register array and an XOR element. The PN code PN1 is used in superimposing the data code 114.

In FIGS. 11, (A), (B), and (C) are diagrams showing the waveform, self-correlation characteristic, and frequency characteristic of the PN code. In FIG. 11, (A) shows the waveform of the PN code. While the M-sequence PN code string is generated as one-bit sequence having binary of 0/1, the first PN code generation unit 130 outputs the M-sequence PN code as a PN code having an amplitude of −1/1. If one bit is applied to one sample of a digital audio signal, in the case of a sampling rate of 44.1 kHz, a PN code string in a cycle of 1023 bits becomes a PN code in a cycle of about 23 ms. In FIG. 11, (A) shows a partial interval of a one-bit/one-sample PN code.

An M-sequence PN code has excellent self-correlation characteristics. As shown by (B) in FIG. 11, a self-correlation value is 1 when phase coincidence is made, and a self-correlation value is constantly substantially 0 in a state of phase shifting. The above-described PN code can be regarded as white noise except that the PN code is repeated in a cycle of about 23 ms (frequency of 43 Hz). For this reason, as shown by (C) in FIG. 11, the frequency characteristic of the PN code is substantially flat over the entire band of 43 to 22.05 k Hz.

The PN code is not limited to an M-sequence insofar as the PN code is cyclic pseudo white noise. The circulation cycle of the PN code is not limited to $2^n-1$ or 1023.

A second PN code generation unit 131 substantially has the same configuration as the above-described first PN code generation unit 130 and generates a PN code (PN2). However, it is assumed that a polynomial which is used in generating a PN code string is a different polynomial having the same cycle as that of the PN code generation unit 130. For example, a polynomial "PN2=$x^{10}+x^8+x^7+x^2+1$" is used. When this polynomial is used, a PN code string having binary of 0/1 is generated, and the second PN code generation unit 131 generates the PN code PN2 as a signal having an amplitude of −1/1. The PN code PN2 is a spread code which is used for reference on the reception side described below.

The PN code PN2 generated by the second PN code generation unit 131 has the self-correlation characteristic and the frequency characteristic shown by (B) in FIG. 11 and (C) in FIG. 11. The PN codes PN1 and PN2 have completely different waveforms, and the mutual correlation value therebetween is substantially 0. Thus, even when the two PN codes are combined and output (emitted), it is possible to separate the two PN codes from each other on the reception side.

Similarly to the PN code PN1, the PN code PN2 is not limited to an M-sequence insofar as the PN code is cyclic pseudo white noise.

Although in the second embodiment, the cycle (number of bits) of the PN code PN2 which is used for reference on the reception side is the same as the cycle of the PN code PN1 which is modulated with the data code, the cycle of PN2 may be an integer fraction of the cycle of PN1.

The modulation PN code PN1 generated by the first PN code generation unit 130 is input to the multiplier 133 and modulated with the data code 114.

The data code 114 to be transmitted is constituted by a bit string expressed in binary. This bit string may be subjected to error correction or interleave processing. The data code 114 is sequentially read by the symbol rate conversion unit 132

Figure 12:
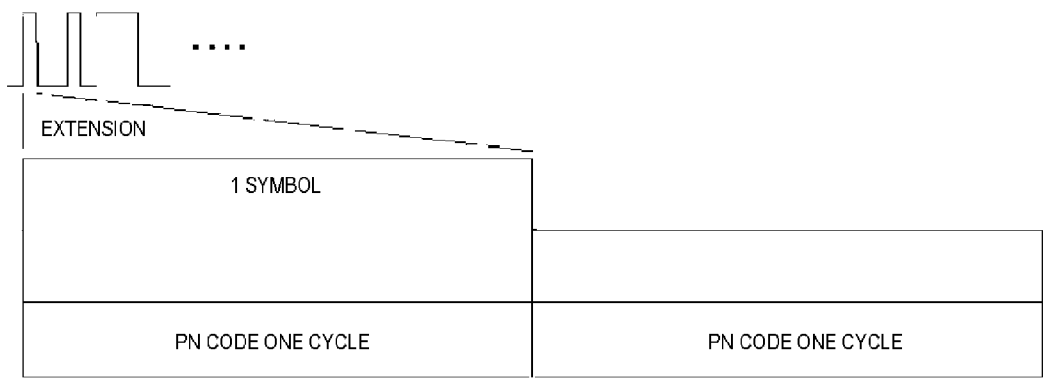
FIG. 12 is a diagram illustrating the function of a symbol rate conversion unit.

As shown in FIG. 12, a symbol rate conversion unit 132 sets one bit of the data code 114 as one symbol and extends one symbol in accordance with the cycle of the PN code. In the second embodiment, the cycle of the PN code PN2 is 1023 samples. Thus, when the read data code is "1", "1" is continuously arranged by 1023 samples. Although the data code has binary of 0/1, similarly to the PN code, the data code is converted to binary of −1/1. The data code converted by the symbol rate conversion unit 132 in such a manner is input to the multiplier 133.

The multiplier 133 multiplies the PN code PN1 generated by the first PN code generation unit 130 and the data code subjected to rate conversion in the symbol rate conversion unit 132 and converted to binary of −1/1. Thus, the PN code PN1 is modulated with the data code which should be transmitted. The PN code PN1 and the data code are both data having binary of −1/1. If the data code is "1", the PN code is output in the same phase. If the data code is "−1" ("0" as bit data), the PN code is output in an opposite phase. In this way, the PN code PN1 is phase-modulated by 0° or 180° in accordance with the data code to be superimposed.

A device on the reception side receives the PN code PN1M modulated with the data code and detects the phase for each frame of PN1M (one cycle of the PN code), demodulating "0/1" of the superimposed data code.

The PN code (hereinafter, called modulation PN code) PN1M modulated with the data code is input to an adder 134 and combined with the reference PN code (hereinafter, called reference PN code) PN2. A combined PN code PNC (combined spread code) is input to a high-pass filter (HPF) 136 and a component in a frequency band which is used by an audio (musical sound) signal 113 distributed in a band equal to or lower than the cutoff frequency is cut off.

The HPF 136 is a circuit unit which cuts off the low-tone range of the PN code PNC such that the frequency band of the audio signal 113 and the frequency band of the PN code PNC do not overlap each other. The cutoff frequency is set to, for example, about 12 kHz such that the output of the above-described LPF 135 and the band do not interfere with each other.

In FIG. 13, (A) shows the frequency characteristic of the PN code PN1 which is band-limited by the HPF with the cutoff frequency of 12 kHz. In this way, if the frequency band of the PN code intrinsically having the frequency characteristic shown by (C) in FIG. 11 is limited as shown by (A) in FIG. 13, the waveform is deformed. Then, the correlation characteristic for the original waveform (see (A) in FIG. 11) is deteriorated as shown by (B) in FIG. 13, making it difficult to determine the phase on the reception side and causing the occurrence of errors in demodulating the superimposed data code.

However, in the invention, the reference PN code PN2 is transmitted as a modulation signal along with the modulation PN code PN1M, such that the deformation of the waveform due to frequency band limitation or the characteristic of the transmission system is cancelled, making it possible to accurately demodulate the data code. The details have been provided in the description of the reception device.

Returning to FIG. 9, a gain control unit 137 is a circuit unit which regulates the gain of the PN code PNC with respect to the audio signal 113 to be superimposed. The gain is determined as an appropriate value through an experiment or the like in consideration of the sense of hearing or the balance, such as the transmission quality of the PN code. For example, the gain is set to −50 dB or the like.

The adder 138 is a circuit unit which adds the audio signal 113 which is band-limited to a mid- and low-tone range (equal to or lower than 10 kHz) by the LPF 135 and the combined PN code PNC (modulation signal) which is band-limited to a high-tone range (equal to or higher than 12 kHz) by the HPF 136, and outputs a combined signal.

Figure 14:
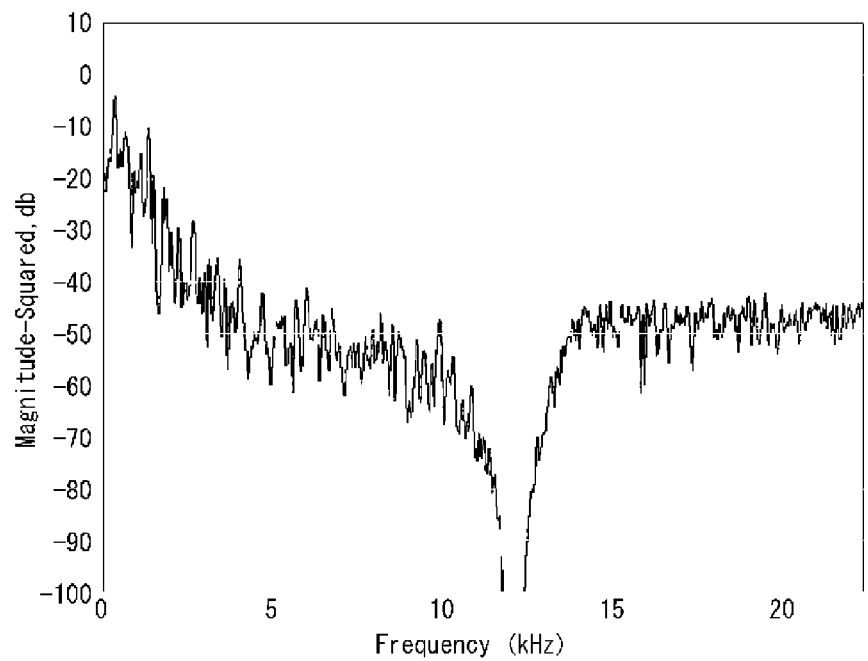
FIG. 14 shows the frequency distribution of a combined signal obtained by combining an audio signal and a PN code.

FIG. 14 shows an example of the frequency characteristic of the combined signal output from the adder 138. A component equal to or higher than 12 kHz is a PN code, and the gain thereof is limited to −50 dB. Meanwhile, a component equal to or lower than 10 kHz (in which the spectrum remains around 11 kHz because of the cutoff characteristic) is the component of the audio signal 113. The combined signal is processed by the analog circuit unit 111 and emitted from the speaker 112.

With regard to the emitted sound, a frequency component of 0 to 10 kHz is an audio component. Thus, the general audience hears the audio component and does not perceive that the PN code is superimposed on the high-tone range. The PN code is superimposed on the high-tone range separated from the frequency band of the audio component, thus there is no case where the sound quality of the audio signal is deteriorated.

Meanwhile, the reception device 102 shown by (B) in FIG. 8 collects the sound by the microphone 122 and extracts only a component equal to or higher than 12 kHz from the collected audio signal to demodulate the data code superimposed on the PN code (PN1M).

Description of Demodulation Unit

Figure 15:
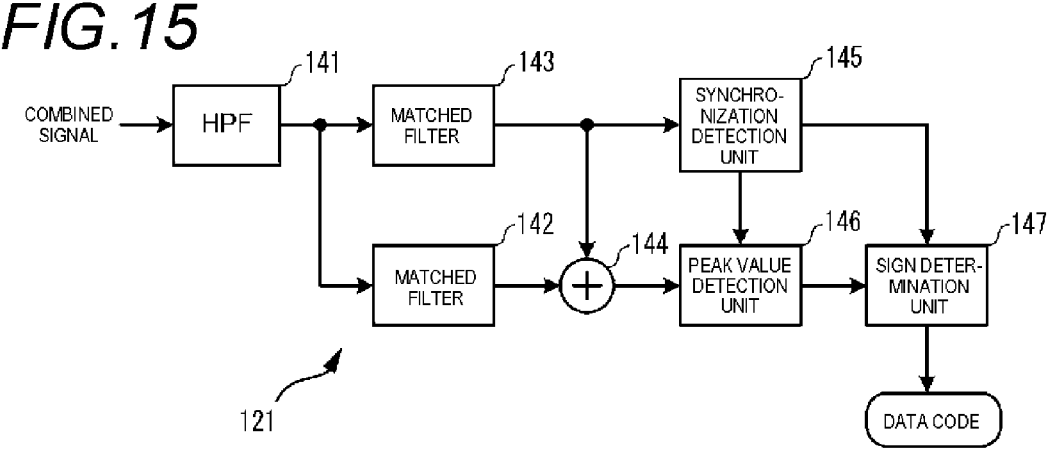
FIG. 15 shows the configuration of a demodulation unit of a reception device.

FIG. 15 shows the detailed configuration of the demodulation unit 121 in the reception device 102. To the demodulation unit 121 is input the combined signal which is collected by the microphone 122 and converted to a digital signal by the analog circuit unit 123. The combined signal is obtained by combining a combined extension signal, in which the modulation PN code PN1 M and the reference PN code PN2 are combined, with the audio signal 113. The demodulation unit 121 separates and extracts the modulation PN code PN1M and the reference PN code PN2 from the combined signal, obtains the correlation value (peak value) with the original PN code string (PN1, PN2), and demodulates the data code on the basis of whether or not the sign (positive/negative) of the peak value of the modulation PN code PN1 M coincides with the sign (positive/negative) of the reference PN code PN2.

For this reason, the demodulation unit 121 includes a high-pass filter 141, matched filters 142 and 143, an adder 144, a synchronization detection unit 145, a peak value detection unit 146, and a sign determination unit 147. Hereinafter, the configuration and function of each functional unit will be described.

The high-pass filter (HPF) 141 is a functional unit which extracts a high-frequency component including the PN code from the received combined signal. The cutoff frequency of the filter may be the same (12 kHz) as the HPF 136 in the modulation unit 110 of the transmission device 101.

A digital audio signal of the high-frequency component of the combined signal extracted by the HPF 141 is input to the matched filters 142 and 143. The matched filters 142 and 143 are filters which detect the correlation value of the input digital audio signal and the PN code string and are constituted by FIR filters.

Figure 16:
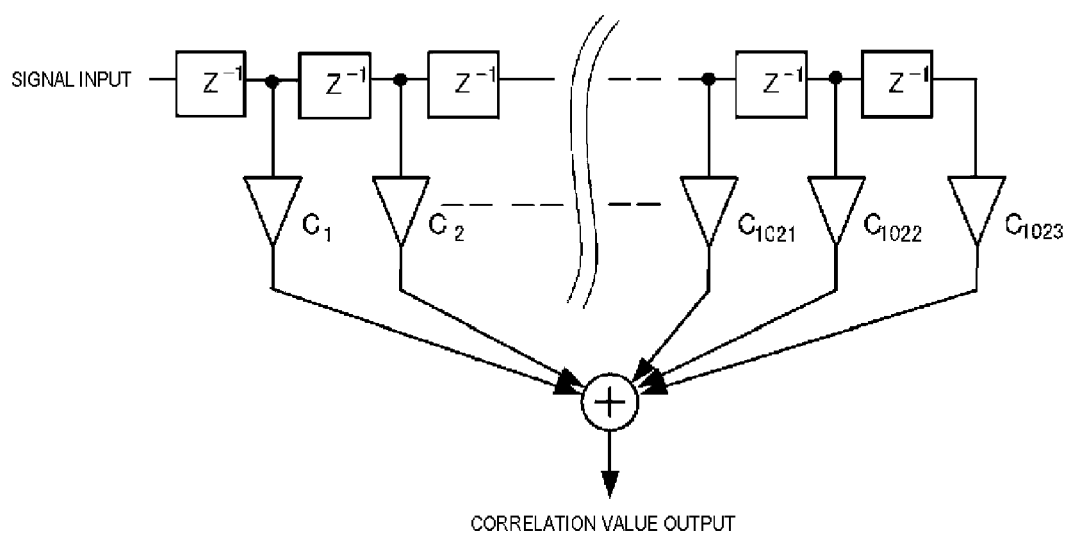
FIG. 16 shows the configuration of a matched filter.

FIG. 16 shows a configuration example of the matched filter 142 (first correlation detection unit). The matched filter 142 is a filter which detects the component of the modulation PN code PN1M from the input digital audio signal. The matched filter 142 is a 1023-stage FIR filter, and the PN code PN1 which is generated by the PN code generation unit 130 on the transmission side is set as the filter coefficient of each stage.

The matched filter 143 (second correlation detection unit) has the same configuration as the matched filter 142, and detects the component of the reference PN code PN2 from the input digital audio signal. The PN code PN2 which is generated by the PN code generation unit 131 is set as the filter coefficient of each stage.

While the PN code string is a bit string of 1/0, the filter coefficient of each of the matched filters 142 and 143 is set to a filter coefficient converted to 1/−1, similarly to the PN code.

The matched filter 142 outputs the correlation value of the input digital audio signal to the PN code string PN1 and outputs a great correlation value (peak value) at a timing at which the component of the modulation PN code PN1M in the digital audio signal and PN1 serving as a filter coefficient string are synchronized with each other. The modulation PN code PN1M in the digital audio signal is phase-modulated with the data code. Thus, when the phase of PN1M is normal (0°), the output of the matched filter 142 outputs a positive correlation value peak. When the phase of PN1M is inverted (180°), the output of the matched filter 142 outputs a negative correlation value peak.

The matched filter 143 outputs the correlation value of the input digital audio signal to the PN code string PN2 and outputs a high correlation value (peak value) at a timing at which the component of the reference PN code PN2 in the digital audio signal and PN2 serving as a filter coefficient string are synchronized with each other. The PN code PN2 is the reference PN code, thus the matched filter 143 constantly outputs a positive correlation value peak.

In FIGS. 17, (A) and (B) show an example of the output waveform of the matched filter. In FIG. 17, (A) shows a correlation value waveform in multiple cycles on a coarse scale. In FIG. 17, (B) shows near a peak on the time axis on a magnified scale. Although a peak is detected in each cycle of the PN code in such a manner, the waveform of the input digital audio signal is deformed. Thus, it is difficult to determine whether the peak is a positive peak or a negative peak. Thus, the correlation value of the modulation PN code and the correlation value of the reference PN code are added, determining the positive and negative of the peak value of the modulation PN code.

The correlation values output from the matched filters 142 and 143 are added in the adder 144. With the addition processing, correlation is highlighted or cancelled. The peak value of the reference PN code output from the matched filter 143 is constantly a positive value. Meanwhile, the polarity of the peak value of the modulation PN code output from the matched filter 142 is inverted in accordance with the positive/negative (1/−1) of the superimposed data code. That is, when the data code is "1", the peak value is a positive value, and when the data code is "−1", the peak value is a negative value. Thus, when the data code is "1", a positive value is added to a positive value, thus the peak value is highlighted. When the data code is "−1", a negative value is added to a positive value, the peak value is cancelled and becomes a small value.

Figure 18:
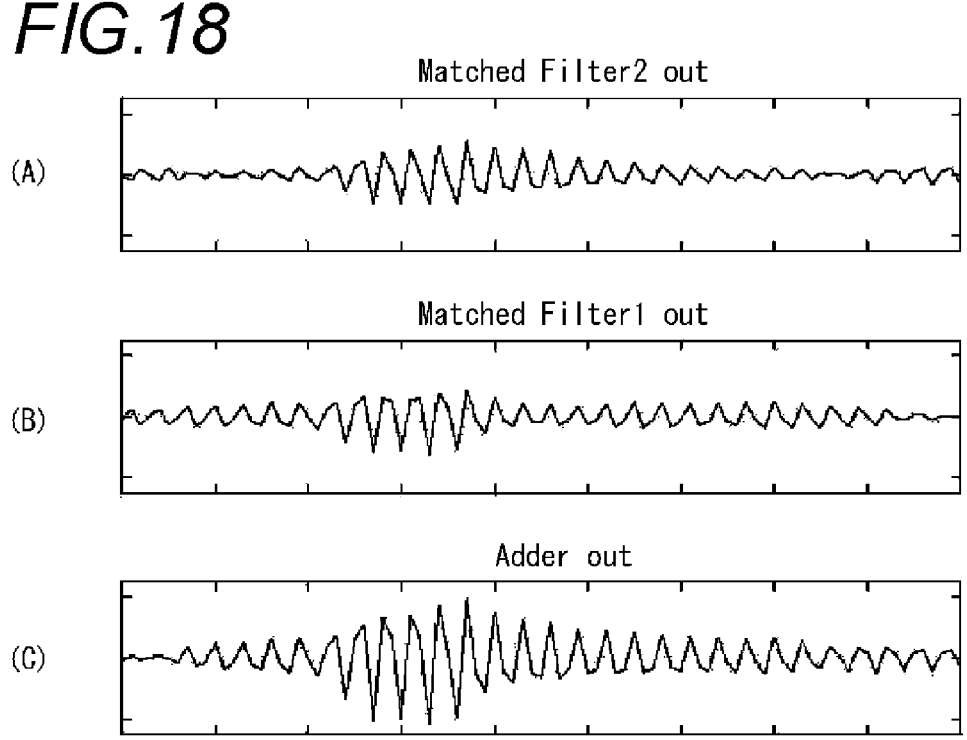
FIG. 18 shows an added waveform when a modulation PN code and a reference PN code are in the same phase.
Figure 19:
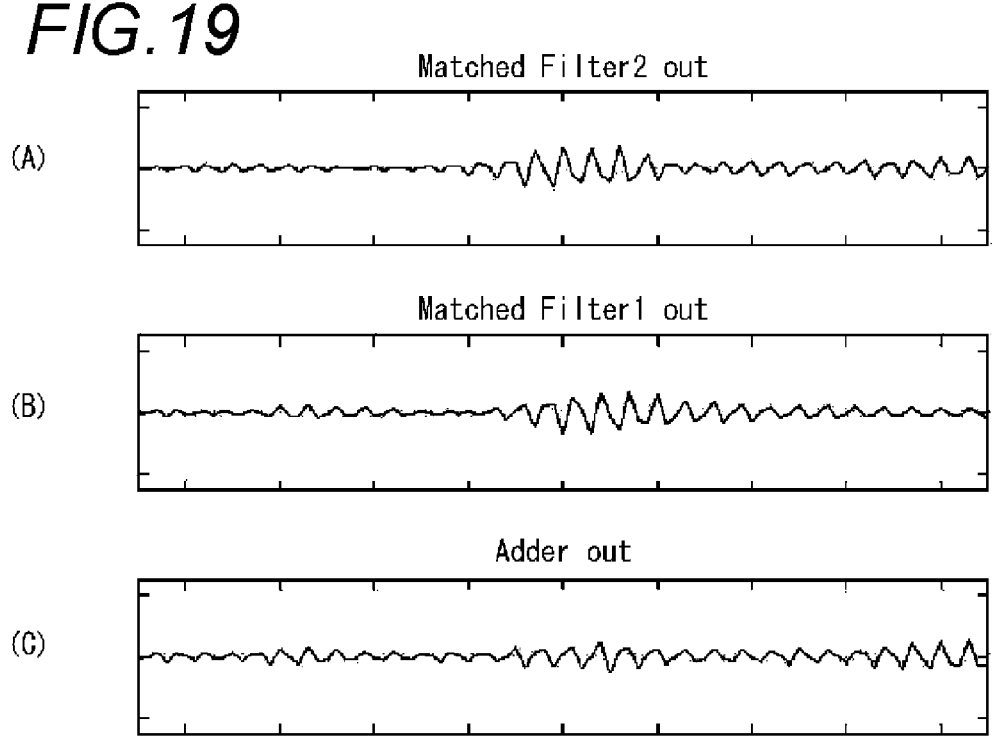
FIG. 19 shows an added waveform when a modulation PN code and a reference PN code are in opposite phases.

FIG. 18 shows an example of the output waveforms of the matched filters 142 and 143 and the adder 144 when the data code is "1". FIG. 19 shows an example of the output waveforms of the matched filters 142 and 143 and the adder 144 when the data code is "−1". These drawings show a partial waveform near a peak.

Of (A) in FIG. 18 to (C) in FIG. 19, (A) in FIG. 18 and (A) in FIG. 19 show the output waveform of the matched filter 143, (B) in FIG. 18 and (B) in FIG. 19 show the output waveform of the matched filter 142, and (C) in FIG. 18 and (C) in FIG. 19 show the output waveform of the adder 144. In (A) in FIG. 18 to (C) in FIG. 19, the outputs of the matched filters 142 and 143 output a somewhat large correlation value indicating that a peak is reached while the positive/negative is unclear. In the added waveform of (C) in FIG. 18, if the output waveforms are combined, a peak is highlighted and the amplitude of a large peak value is generated. Meanwhile, in the added waveform shown in the lower part of FIG. 19, if the two waveforms are combined, the output waveforms are cancelled and a peak is almost reduced. As described above, if there is a peak of a combined waveform at a peak timing, it can be determined that the data code is "1", and if a peak of a combined waveform is reduced at a peak timing, it can be determined that the data code is "−1". Thus, it becomes possible to carry out data demodulation with higher reliability compared to a case where it is determined whether the data code is "1" or "−1" directly from the waveforms of (B) in FIG. 18 and (B) in FIG. 19.

The matched filters 142 and 143 and the adder 144 all output the correlation values at a sample timing. The synchronization detection unit 145 detects the position of the correlation value string (waveform) where the synchronization point of a reference and a received signal, that is, a peak timing exists.

The synchronization detection unit 145 accumulates the correlation value string (output waveform) output from the matched filter 143 for one frame (1023 samples), detects a positive maximum value in the correlation value string, and determines the sample timing of the maximum value as the peak timing. The peak timing is output to the peak value detection unit 146 and the maximum value (peak value) at this time is output as a threshold value to the sign determination unit 147.

The peak value detection unit 146 extracts a predetermined sample interval (peak value detection interval) from the output waveform of the adder 144 on the basis of the peak timing information received from the synchronization detection unit 145 and detects a peak value from the sample interval. The peak value is detected from the predetermined sample interval as well as one sample of the peak timing, absorbing phase shift in the sampling clock or frequency variation between the transmitting and receiving systems.

In FIGS. 20, (A) and (B) are diagrams illustrating a method of determining a peak value detection interval in the peak value detection unit 146. In FIG. 20, (A) shows a method in which peak value detection is carried out multiple times on the basis of one time of synchronization detection. In FIG. 20, (B) shows a method in which synchronization detection is carried out for each frame.

In (A) of FIG. 20, the synchronization detection unit 145 detects a peak timing on the basis of the reference PN code at a certain timing (for example, at the time of the start of reception of the reference PN code). The peak value detection unit 146 detects a peak value with an interval of 30 samples before and after the peak timing detected by the synchronization detection unit 145 as a peak value detection interval and outputs the peak value to the sign determination unit 147. The peak value detection unit 146 buffers the combined correlation value input from the adder 144 by the necessary number of samples. Thereafter, the next peak value is detected with 30 samples before and after the next peak timing as a peak value detection interval with a timing when counted by 1023 samples from the peak timing as the next peak timing. This processing is repeatedly performed.

In (B) of FIG. 20, in this method, the synchronization detection unit 145 detects the peak timing for each frame and notifies the peak timing to the peak value detection unit 146. The peak value detection unit 146 detects the peak value with 30 samples before and after the peak timing notified from the synchronization detection unit 145 as a peak value detection interval and outputs the peak value to the sign determination unit 147.

According to a method of (B) in FIG. 20 in which a peak timing is detected for each frame, frame synchronization is made with high accuracy, but a processing load of a processing unit increases. While the method of (A) in FIG. 20 may be used in which the next peak timing is estimated by counting the clocks for one frame, the synchronization detection unit 145 may detect the peak timing at an interval of about one degree for multiple frames.

Figure 21:
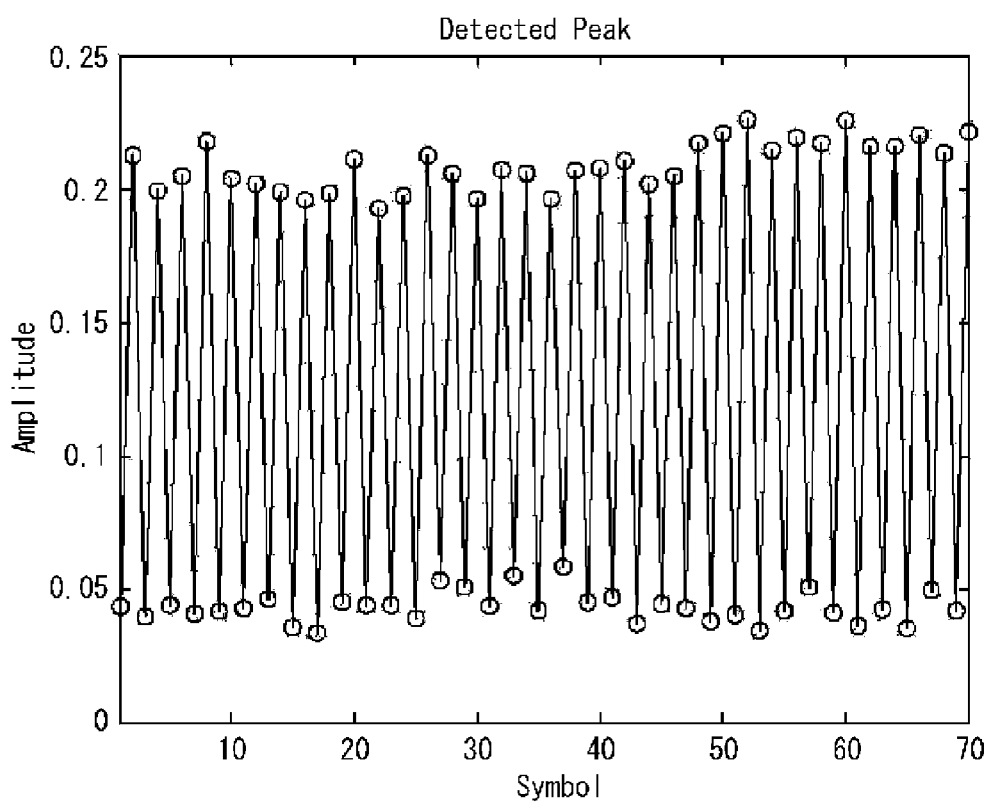
FIG. 21 shows an example of detected peak value string.

FIG. 21 shows an example of the output value of the peak value detection unit 146. FIG. 21 shows an example where the modulation signal PN1M is modulated with the data code which alternates between 0/1. The correlation value of the modulation PN code PN1M and the correlation value of the reference PN code PN2 are added, such that a difference between the peak values due to the data code becomes clear and a large peak value ("1") and a small peak value ("0") are alternately output.

Figure 22:
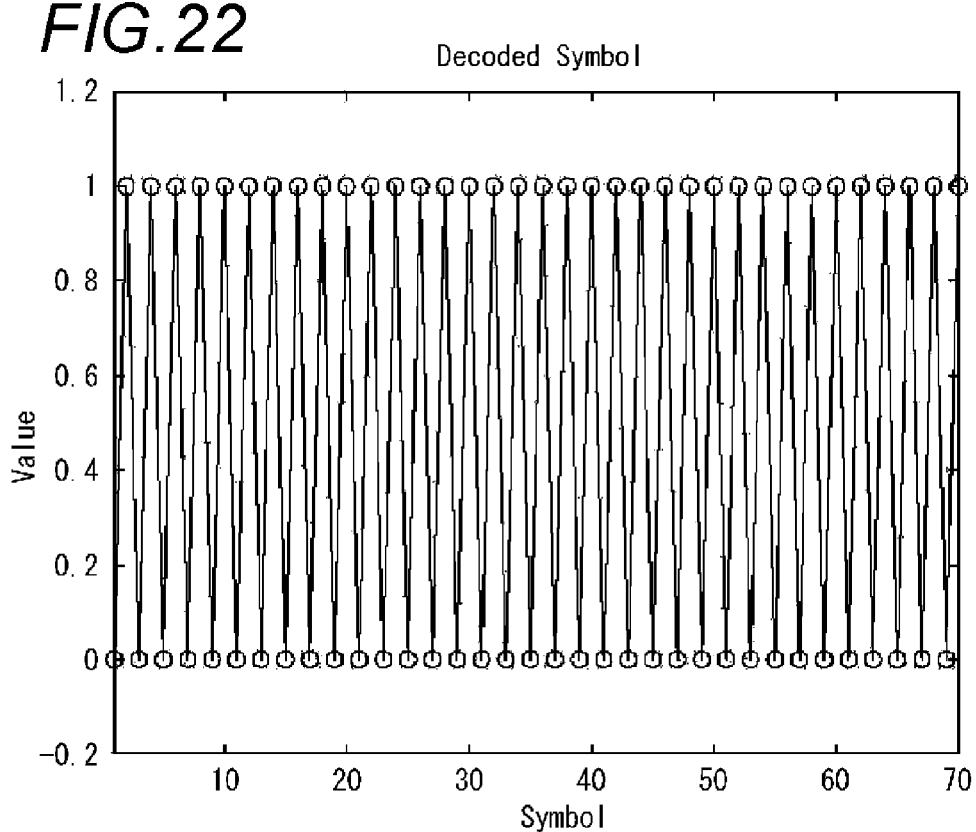
FIG. 22 shows an example of a combined data code string.

The sign determination unit 147 binarizes this value with the peak value of the reference signal input from the synchronization detection unit 145 as a threshold value, and demodulates (decodes) and outputs a data code string of 1/0 shown in FIG. 22.

Modification

Figure 23:
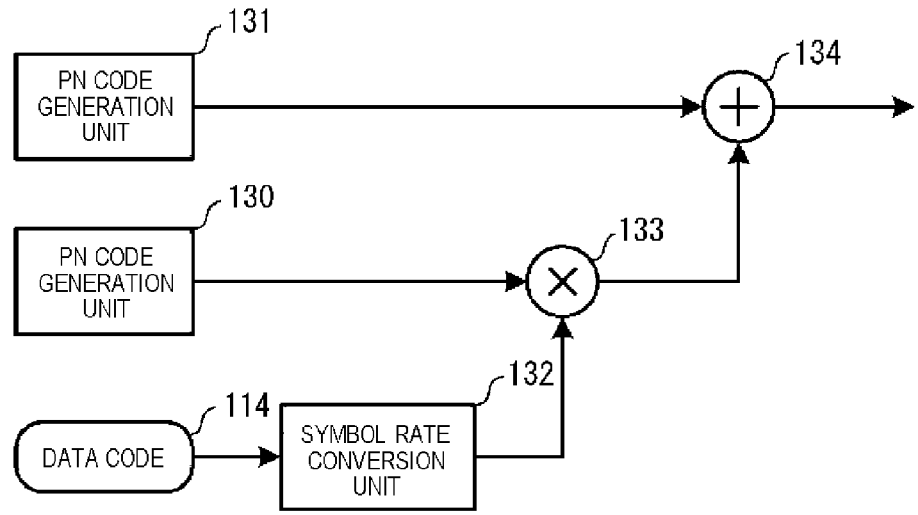
FIG. 23 shows another embodiment of a modulation unit.

Although in the above-described second embodiment, the PN code is combined in the high-tone range of the audio signal 113 to be heard by the audience such that the audience cannot hear the PN code and the sound quality of the audio signal 113 is degraded, the PN code (modulation PN code, reference PN code) may be transmitted and received as it is without being combined with the audio signal 113. That is, although in the above-described second embodiment, the frequency band of the PN code is limited to be equal to or higher than 10 kHz by the high-pass filter 136 and the signal level is limited to −50 dB by the gain control unit 137, these may be omitted. Although the PN code is emitted while being mixed with an audible audio signal, such as musical sound, only the PN code may be emitted. FIG. 23 shows a configuration example of a modulation unit when only a PN code is output with no frequency band limitation and signal level limitation.

Multiple modulation PN codes may be superimposed and transmission of the data code may be multiplexed. In this case, as shown in FIG. 24, a plurality of sets of the PN code generation unit 130, the symbol rate conversion unit 132, and the multiplier 133 may be provided, the PN code generation units 130 may generate different code-sequence PN codes, and different data codes may be input to the symbol rate conversion units 132.

Figure 24:
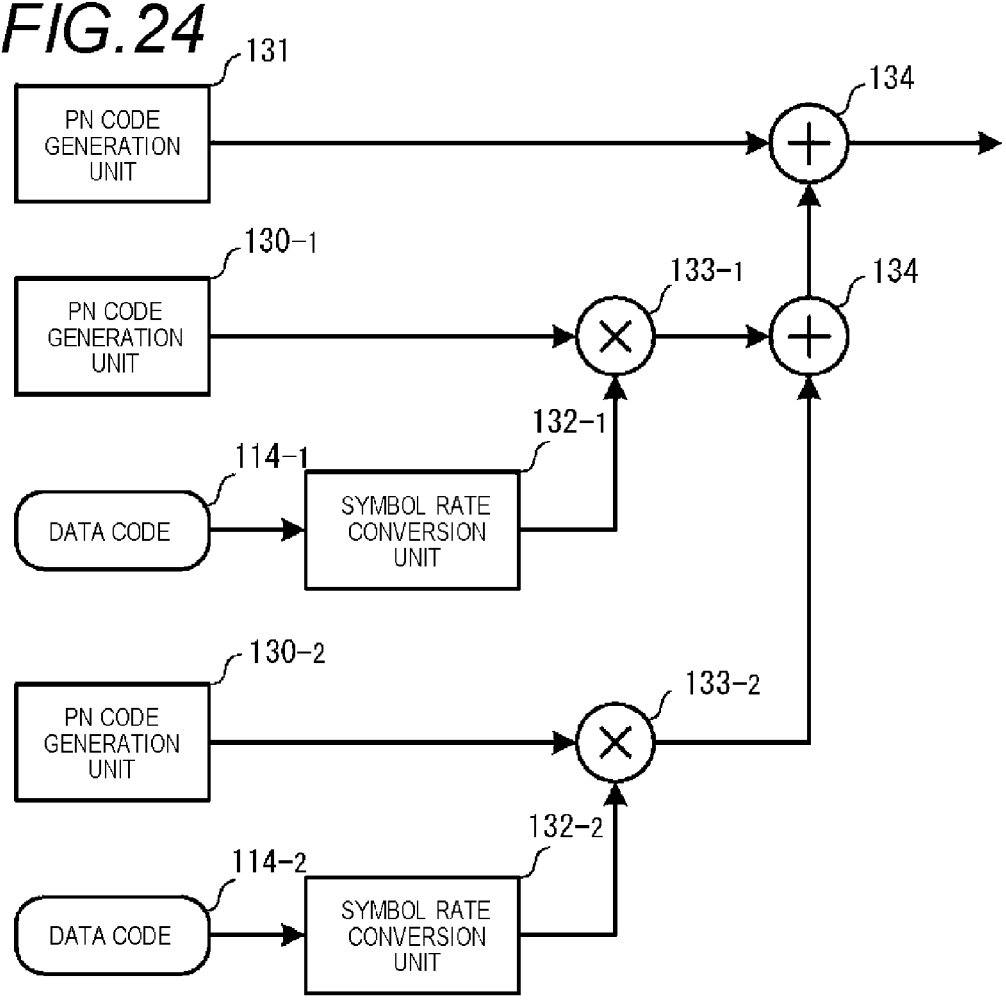
FIG. 24 shows yet another embodiment of a modulation unit.

Although FIG. 24 shows an example where only a PN code is output without frequency band limitation and signal level limitation and transmission of a data code is multiplexed, transmission of a data code may be multiplexed with the configuration of FIG. 8.

Figure 25:
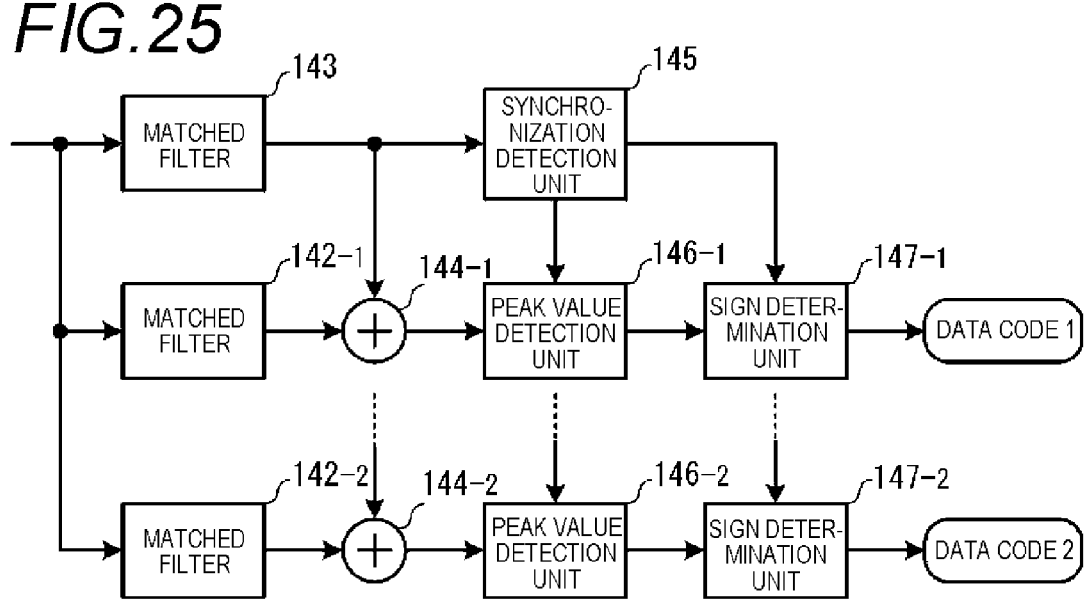
FIG. 25 shows another embodiment of a demodulation unit.

When the reception device 102 receives and demodulates a multiplexed signal, the demodulation unit 121 is configured as shown in FIG. 25. That is, a plurality of sets of the matched filter 142, the adder 144, the peak value detection unit 146, and the sign determination unit 147 are provided, and the PN code string of the multiplexed modulation PN code is set as the filter coefficient of each matched filter 142.

Although in the above-described second embodiment, a system has been described in which audio (sound) is emitted to air to perform audio communication, a medium through which audio propagates is not limited to the air. For example, the invention may be applied to audio communication through a solid or a liquid. The invention is not limited to audio communication and may be applied to wired communication or wireless communication in which an audio signal electrically or electromagnetically propagates as an electrical signal. The invention may also be applied to a case where an audio signal is converted to a digital audio signal and streaming or file transmission is carried out.

Although in the above-described embodiment, a PN code in an audible frequency band (sampling rate 44.1 kHz) is used, a PN code in a higher frequency band (ultrasonic range) may be used.

In the second embodiment, a modulation pseudo noise signal (modulation PN code) and a reference pseudo noise signal (reference PN code) are synchronized with each other, it is possible to obtain the synchronized peak waveform of the correlation value on the reception side. While the reference pseudo noise signal is constantly in a positive phase, the modulation pseudo noise signal is phase-modulated with the data code. Thus, the correlation values are added, making it possible to highlight or cancel the peak value of the correlation value based on the content of the data code. In demodulating the data code, it should suffice that only relative phase information of the correlation value peak waveform of the modulation pseudo noise signal and the reference pseudo noise signal is used. Thus, in any reproduction apparatus, speaker, or transmission path, the transmission characteristic is completely negligible, making it possible to perform robust audio communication.

The second embodiment is not limited to audio communication and may be applied to communication using wired or wireless transmission of an analog audio signal or communication using streaming or file transmission of a digital audio signal.

A pseudo noise signal is superimposed on a high-tone range of an audible sound signal, such as an audio signal, allowing a communication signal component to propagate along with audible sound without deteriorating the sense of hearing.

Third Embodiment

An audio communication system of a third embodiment is similar to the system shown in FIG. 8, thus description thereof will be omitted. In the third embodiment, the modulation unit 110 and the demodulation unit 121 of FIG. 8 are respectively referred to as a modulation unit 210 and a demodulation unit 221, and will be described below.

Figure 26:
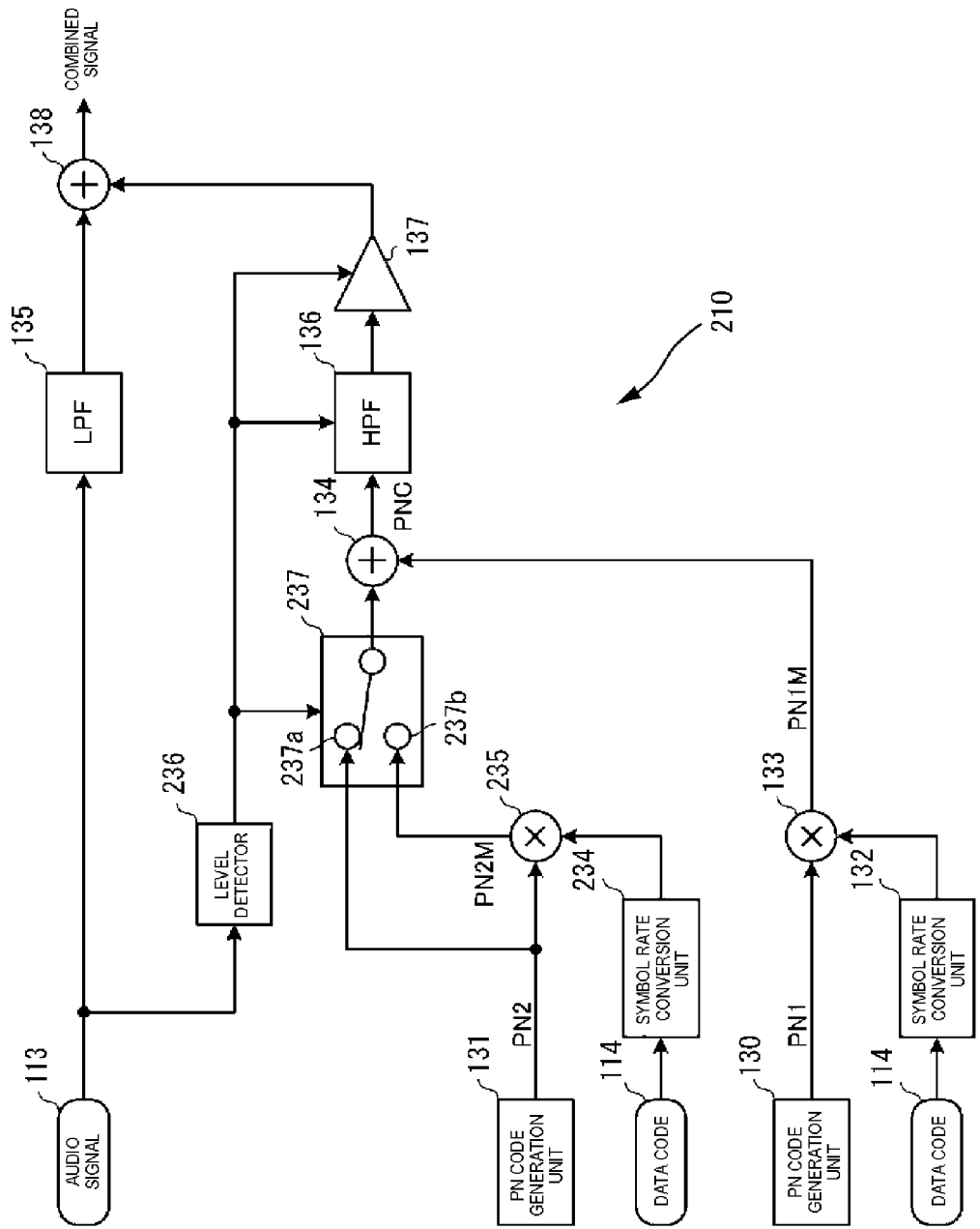
FIG. 26 is a configuration diagram of an audio communication system according to a third embodiment of the invention.

FIG. 26 shows the configuration of the modulation unit 210 in the audio communication system according to the third embodiment of the invention. In FIG. 26, the same parts as those in the modulation unit 110 of the second embodiment shown in FIG. 9 are represented by the same reference numerals, and description thereof will be omitted.

Description of Modulation Unit

An audio signal which is generated by the modulation unit 210 of the third embodiment includes an audio signal 113 and two pseudo noise signals (first PN code PN1 and second PN code PN2).

FIG. 26 is a block diagram showing the configuration of the modulation unit 210. The modulation unit 210 is a functional unit which generates and outputs a combined signal obtained by combining the audio signal 113 and the two PN codes (spread codes). One (first PN code PN1) or both of the two PN codes are modulated with a data code 114. When the audio signal 113 is on mute (the volume level is equal to or smaller than a predetermined value), both the first and second PN codes are modulated with the data code 114 (parallel mode). When the audio signal 113 is emitted with a volume level equal to or greater than the predetermined value, only the first PN code PN1 is modulated with the data code 114 (reference mode). In the reference mode, another PN code, that is, the second PN code PN2 is not modulated and is output as a reference signal which constantly has a positive phase.

A level detector 236 is a functional unit which detects the level (volume level) of the input audio signal 113. The level detector 236 compares the level of the audio signal 113 with a predetermined threshold value and outputs a level detection signal (high/low) as the comparison result. When the level detection signal is "high", the modulation unit 210 operates in the reference mode, and when the level detection signal is "low", the modulation unit 210 operates in the parallel mode. The level detection signal is input to a switch 237, a high-pass filter 136, and a gain control unit 137 described below.

A low-pass filter (LPF) 135, a first PN code generation unit 130, and a second PN code generation unit 131 of the third embodiment have the same configuration as the low-pass filter 135, the first PN code generation unit 130, and the second PN code generation unit 131 of the second embodiment, thus description thereof will be omitted.

The PN code PN1 generated by the PN code generation unit 130 is input to a multiplier 133 and modulated with the data code 114.

The data code 114 to be transmitted is constituted by a bit string expressed in binary. The bit string may be subjected to error correction or interleave processing. The data code 114 is sequentially read by the symbol rate conversion unit 132.

As shown in FIG. 12, the symbol rate conversion unit 132 sets one bit of the data code 114 as one symbol and extends one symbol in accordance with the cycle of the PN code. In this embodiment, the cycle of the PN code PN1 is 1023 samples. For this reason, when the read data code is "1", "1" is continuously arranged by 1023 samples. Although the data code has binary of 0/1, similarly to the PN code, the data code is converted to binary of −1/1. The data code converted by the symbol rate conversion unit 132 in such a manner is input to the multiplier 133.

The multiplier 133 multiplies the PN code PN1 generated by the PN code generation unit 130 and the data code subjected to rate conversion in the symbol rate conversion unit 132 and converted to binary of −1/1. Thus, the PN code PN1 is modulated with the data code which should be transmitted. The PN code PN1 and the data code are both data having binary of −1/1. If the data code is "1", the PN code is output in the same phase, and if data code is "−1" ("0" as bit data), the PN code is output in an opposite phase. In this way, the PN code PN1 is phase-modulated by 0° or 180° in accordance with the superimposed data code.

A device on the reception side receives the PN code PN1M modulated with the data code and detects the phase for each frame of PN1M (one cycle of the PN code), demodulating "0/1" of the superimposed data code. The PN code PN1M modulated with the data code is input to the adder 134.

The PN code PN2 generated by the PN code generation unit 131 is input to a first terminal 237a of the switch 237 and also input to a multiplier 235.

A symbol rate conversion unit 234 and the multiplier 235 have the same functions of the symbol rate conversion unit 132 and the multiplier 133 of the first PN code PN1. That is, as shown in FIG. 12, the symbol rate conversion unit 234 sets one bit of the data code 114 as one symbol and extends one symbol in accordance with the cycle of the PN code. The data code converted by the symbol rate conversion unit 234 is input to the multiplier 235. The multiplier 235 multiplies the PN code PN2 generated by the PN code generation unit 131 and the data code subjected to rate conversion in the symbol rate conversion unit 234 and converted to binary of −1/1. Thus, the PN code PN2 is modulated with the data code which should be transmitted.

The modulated PN code PN2M output from the multiplier 235 is input to a second terminal 237b of the switch 237.

The switch 237 switches connection on the basis of the level detection signal input from the level detector 236. When the level detection signal is "high", that is, the signal level of the audio signal 113 is higher than a threshold value, connection is switched to the first terminal 237a. When the level detection signal is "low", that is, the level of the audio signal 113 is lower than the threshold value, connection is switched to the second terminal 237b.

Thus, when the signal level of the audio signal 113 is higher than the threshold value, the switch 237 outputs the unmodulated PN code PN2 as the reference PN code to operate the modulation unit 210 in the reference mode. When the level of the audio signal 113 is lower than the threshold value, the switch 237 outputs the modulated PN code PN2M to operate the modulation unit 210 in the parallel mode.

That is, when the level of the audio signal 113 is high, the audio signal 113 becomes noise with respect to the PN code for data transmission. In this case, the low range of the PN code is cut off so as not to interfere with the audio signal 113 and the waveform is deformed. For this reason, the second PN code PN2 is not modulated and is used as the reference PN code (reference mode). When the level of the audio signal 113 is low (on mute), there is no audio signal which becomes noise and it is not necessary to cut off the low range because there is no audio component. Thus, it is possible to transmit the PN code with satisfactory signal quality, such that the two PN codes PN1 and PN2 are modulated with data and a double transmission rate is obtained (parallel mode).

Although in FIG. 26, the terminals of the switch 237 are switched on the basis of the level detection signal, it is assumed that data reading by the symbol rate conversion unit 234 or modulation by the multiplier 235 also stops.

The PN code PN2 or PN2M output from the switch 237 is input to the adder 134 and combined with the modulated PN code PN1M. The combined PN code PNC (combined spread code) is input to the high-pass filter (HPF) 136.

The HPF 136 is a filter which cuts off the low-range component of the combined spread code. The cutoff frequency is switched on the basis of the level detection signal input from the HPF 136 and the level detector 236. When the level detection signal is "high", that is, in the reference mode, the cutoff frequency is switched to a high frequency (first value). When the level detection signal is "low", that is, in the parallel mode, the cutoff frequency is switched to a low frequency (second value). The cutoff frequency of the HPF 136 is set to, for example, 12 kHz when the level detection signal is "high" and 0 Hz when the level detection signal is "low" (that is, the spread code bypasses the HPF 136). When the spread code goes through the HPF 136, the spread code passes through a delay unit having the same delay amount as the HPF such that signal synchronization is not shifted. The cutoff frequency is not limited to this example.

If the spread code bypasses the HPF 136, the first and second PN codes PN1 and PN2 are substantially output while maintaining the waveforms of (A) to (C) in FIG. 11. If the cutoff frequency of the HPF 136 is 12 kHz, the waveforms of the first and second PN codes PN1 and PN2 are significantly deformed.

In FIG. 13, (A) shows the frequency characteristic of a PN code PN1 which is band-limited by an HPF having a cutoff frequency of 12 kHz. In this way, if the frequency band of the PN code intrinsically having the frequency characteristic shown by (C) in FIG. 11 is limited as shown by (A) in FIG. 13, the waveform is deformed. Then, the correlation characteristic to the original waveform (see (A) in FIG. 11) is deteriorated as shown by (B) in FIG. 13, making it difficult to determine the phase on the reception side and causing the occurrence of errors in demodulating the superimposed data code.

However, in the invention, when the cutoff frequency of the HPF 136 is set to 12 kHz in the reference mode, the second PN code is output without being modulated and is used as a reference for obtaining the synchronization timing of the modulated first PN code (modulation PN code) PN1M. Thus, the deformation of the waveform due to frequency band limitation or the characteristic of the transmission system is cancelled, making it possible to accurately demodulate the data code. The details have been provided in the description of the reception device.

Returning to FIG. 26, the gain control unit 137 is a circuit unit which regulates the gain of the combined PN code PNC (combined spread code) with respect to the audio signal 113. The gain is determined as an appropriate value through an experiment or the like in consideration of the sense of hearing or the balance, such as the transmission quality of the PN code, and the gain varies depending on the level detection signal (high/low). The gain is set to −50 dB when the level detection signal is "high" and −20 dB when the level detection signal is "low". The adder 138 is a circuit unit which adds the audio signal 113 and the combined PN code PNC (combined spread code), and outputs a combined signal.

FIG. 14 shows an example of the frequency characteristic of the combined signal output from the adder 138 when the level detection signal is "high", that is, in the reference mode. A component equal to or higher than 12 kHz is the PN code, and the gain is limited to −50 dB. A component equal to or lower than 10 kHz (in which the spectrum remains around 11 kHz because of the cutoff characteristic) is the component of the audio signal 113. The combined signal is processed by the analog circuit unit 111 and emitted from the speaker 112.

With regard to the emitted sound, a frequency component of 0 to 10 kHz is an audio component. Thus, the general audience hears the audio and does not recognize that the PN code is superimposed on the high-tone range. The PN code is superimposed on the high-tone range separated from the frequency band of the audio component, thus there is no case where the sound quality of the audio signal is deteriorated.

When the level detection signal is "low", that is, in the parallel mode, the component of the audio signal 113 scarcely appears. The PN code input from the gain control unit 137 bypasses the HPF 136 and the frequency band thereof is not limited. For this reason, the PN code is substantially distributed over the entire frequency band.

Description of Demodulation Unit

Figure 27:
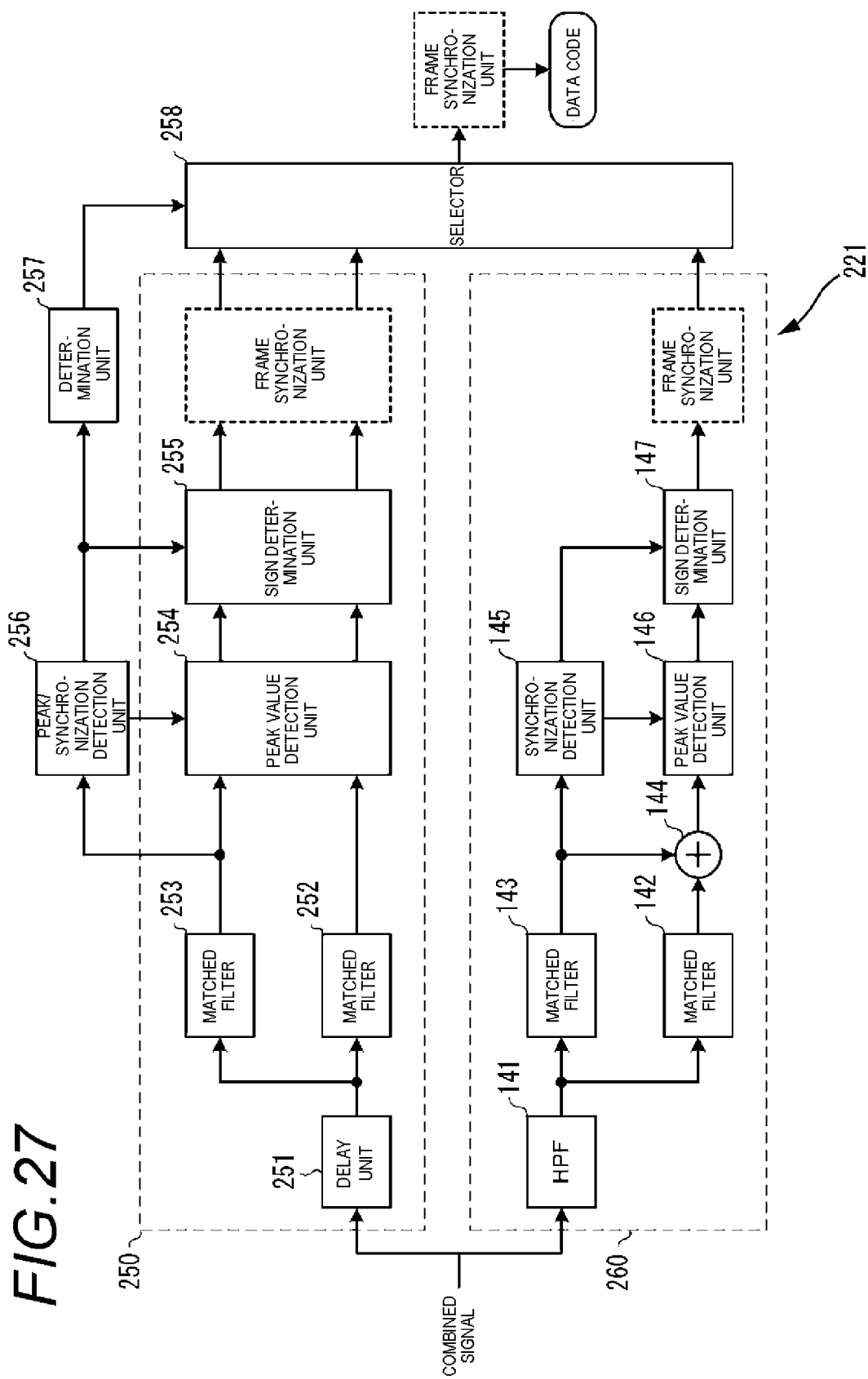
FIG. 27 shows the configuration of a demodulation unit of a reception device.

FIG. 27 shows the detailed configuration of the demodulation unit 221 in the reception device 102. To the demodulation unit 221 is input the combined signal which is collected by the microphone 122 and converted from an analog signal to a digital signal by the analog circuit unit 123. The combined signal is a signal obtained by combining the audio signal 113 with a combined extension signal in which the first PN code and the second PN code are combined.

The demodulation unit 221 separates and extracts the first and second PN codes from the combined signal and detects whether the PN codes are transmitted in the reference mode or the parallel mode. In the case of the reference mode, the first PN code PN1M is demodulated with the second PN code PN2 as the reference PN code. In the case of the parallel mode, the data code is demodulated from each of the first and second PN codes PN1M and PN2M.

With regard to the demodulation of the data code, the correlation value (peak value) of the separated and extracted PN code and the original PN code string (PN1, PN2) is obtained, and the data code is demodulated on the basis of whether or not the sign (positive/negative) of the peak value of the modulation PN code PN1M (PN2M) coincides with the sign (positive/negative) of the reference PN code PN2. The determination on whether the PN code is in the parallel mode or the reference mode is made on the basis of whether or not the second PN code can be demodulated as it is and synchronization can be made.

In order to determine the mode from the reference mode and the parallel mode, a matched filter 253, a peak synchronization detection unit 256, and a determination unit 257 (mode determination unit) are provided. The matched filter 253 is a filter which detects the correlation value of the input digital audio signal and the PN code string and is constituted by an FIR filter. FIG. 16 shows a configuration example of the matched filter 253. The matched filter 253 is a filter which detects the component of the second PN code PN2 from the input digital audio signal. The matched filter 253 is a 1023-stage FIR filter, and a pseudo noise code string PN2 (for example, "PN2=x^10+x^8+x^7+x^2+1") which is generated by the PN code generation unit 131 on the transmission side is set as the filter coefficient of each stage.

If the PN code is in the parallel mode, that is, if the input digital audio signal does not include an audio component and the second PN code PN2 is not band-limited, the matched filter 253 outputs a correlation waveform shown by (A) in FIG. 28 and (B) in FIG. 28. In FIG. 28, (A) shows a correlation value waveform in multiple cycles on a coarse scale. In FIG. 28, (B) shows near a peak on the time axis on a magnified scale. In this way, a large peak is detected on the positive side in each cycle of the PN code.

Figure 29:
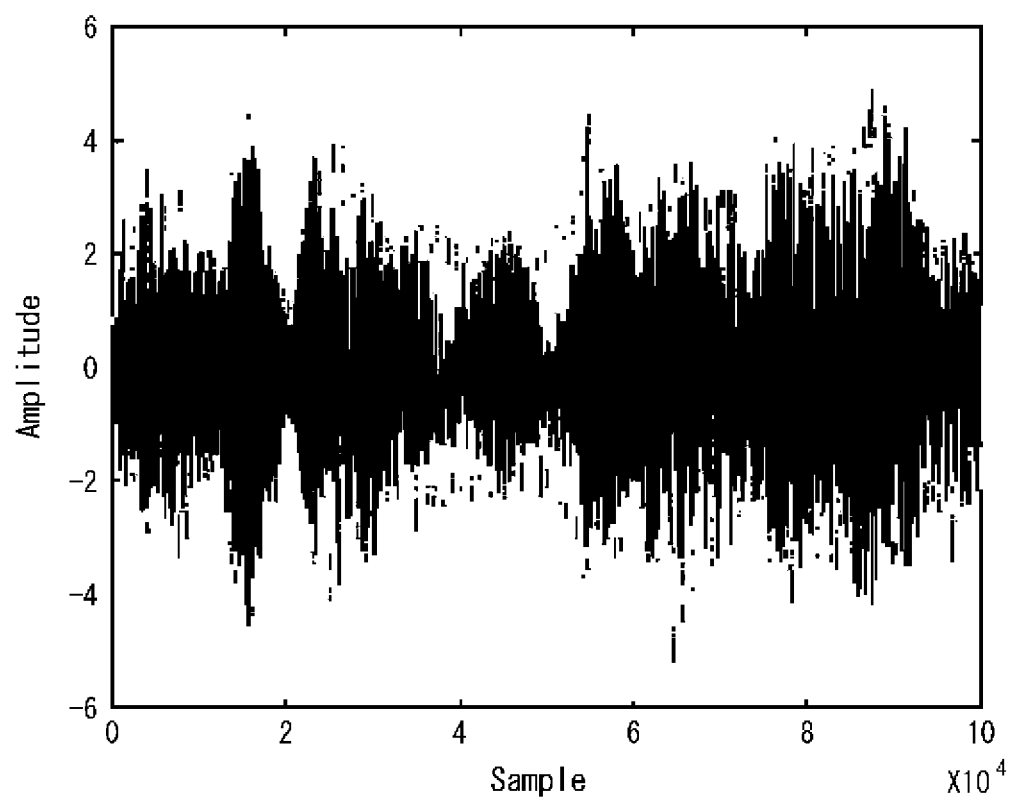
FIG. 29 shows a temporal change in a correlation value output from a matched filter when a signal including an audio signal is input.

If the PN code is in the reference mode, that is, if the input digital audio signal includes an audio component and the second PN code PN2 is band-limited, the matched filter 253 outputs a correlation waveform shown in FIG. 29. The audio signal acts as noise in synchronization with the PN code, no correlation is made in the signal including the audio signal and there is no clear peak.

The peak synchronization detection unit 256 receives the correlation value waveform of the matched filter 253, obtains a peak, and outputs information of the peak timing. Specifically, the correlation value waveform input from the matched filter 253 is stored in a buffer during one or more cycles, thus the timing of the largest value and the second largest value as an absolute value is obtained. The determination unit 257 determines whether or not the interval between two peaks coincides with one cycle of the PN code string. If the peak interval coincides with one cycle of the PN code string, it is considered that the input digital audio signal does not include an audio component and the PN code is not band-limited (parallel mode). When the peak interval does not coincide with one cycle of the PN code string or when the interval is unstable, it is considered that the input digital audio signal includes an audio component and the PN code is band-limited (reference mode).

The determination unit 257 outputs the determination result to a selector 258. In the case of the parallel mode, the selector 258 selects a first demodulation block 250 as a functional block for data demodulation. In the case of the reference mode, the selector 258 selects a second demodulation block 260 as a functional block for data demodulation.

The matched filter 253 and the peak synchronization detection unit 256 are also used as a part of the first demodulation block 250.

First, the second demodulation block 260 which is used in the reference mode has the same configuration as the demodulation unit 121 of the second embodiment, thus description thereof will be omitted.

Next, the first demodulation block 250 which is used in the parallel mode will be described. In the parallel mode, the two PN codes PN1 and PN2 are both phase-modulated with the data code. Thus, the first demodulation block 250 demodulates data separately from the PN code PN1 and the PN code PN2. The first demodulation block 250 includes a delay unit 251, a matched filter 252, a peak value detection unit 254, and a sign determination unit 255, in addition to the matched filter 253 and the peak synchronization detection unit 256 which are used for mode detection.

The delay unit 251 is a circuit unit which delays an input signal for signal synchronization with the second demodulation block 260 into which the HPF 141 is inserted. The digital audio signal output from the delay unit 251 is input to the matched filter 252 and the matched filter 253. The matched filters 252 and 253 have the same configuration and the same filter coefficients as the matched filters 142 and 132 of the second demodulation block 260.

The correlation value waveforms output from the matched filters 252 and 253 are input to the peak value detection unit 254. The peak value detection unit 254 detects the peak value at the synchronization timing of the PN code string. The synchronization timing is provided from the peak synchronization detection unit 256 which detects the synchronization timing on the basis of the second PN code. The peak value detected by the peak value detection unit 254 is input to the sign determination unit 255.

In the parallel mode in which the first demodulation block 250 operates, the PN code is not band-limited and the audio signal is not mixed. For this reason, the correlation value waveforms output from the matched filters 252 and 253 have a clear peak shown in FIG. 28. Thus, the positive and negative of the peak value detected by the peak value detection unit 254 is also clear.

The sign determination unit 255 determines the sign of data superimposed on both the PN codes on the basis of the peak values of PN1M and PN2M input from the peak value detection unit 254.

A frame synchronization unit which makes data frame synchronization may be provided at the back of the sign determination unit 255 or 147 or at the back of the selector 258 in accordance with a data distribution method to the first PN code and the second PN code.

With the above-described configuration, regardless of whether two PN codes in an audio signal emitted from the transmission device 101 are modulated in the reference mode or the parallel mode, the PN codes are automatically recognized, and data can be demodulated.

Modification

Although in the above-described embodiment, in the parallel mode, the second PN code is modulated with the data code, and in the reference mode, the second PN code is output as it is, alternatively in the reference mode, a third PN code of a code sequence different from the second PN code in the parallel mode may be output. Thus, it becomes easy to determine the reference mode or the parallel mode on the reception side.

Figure 30:
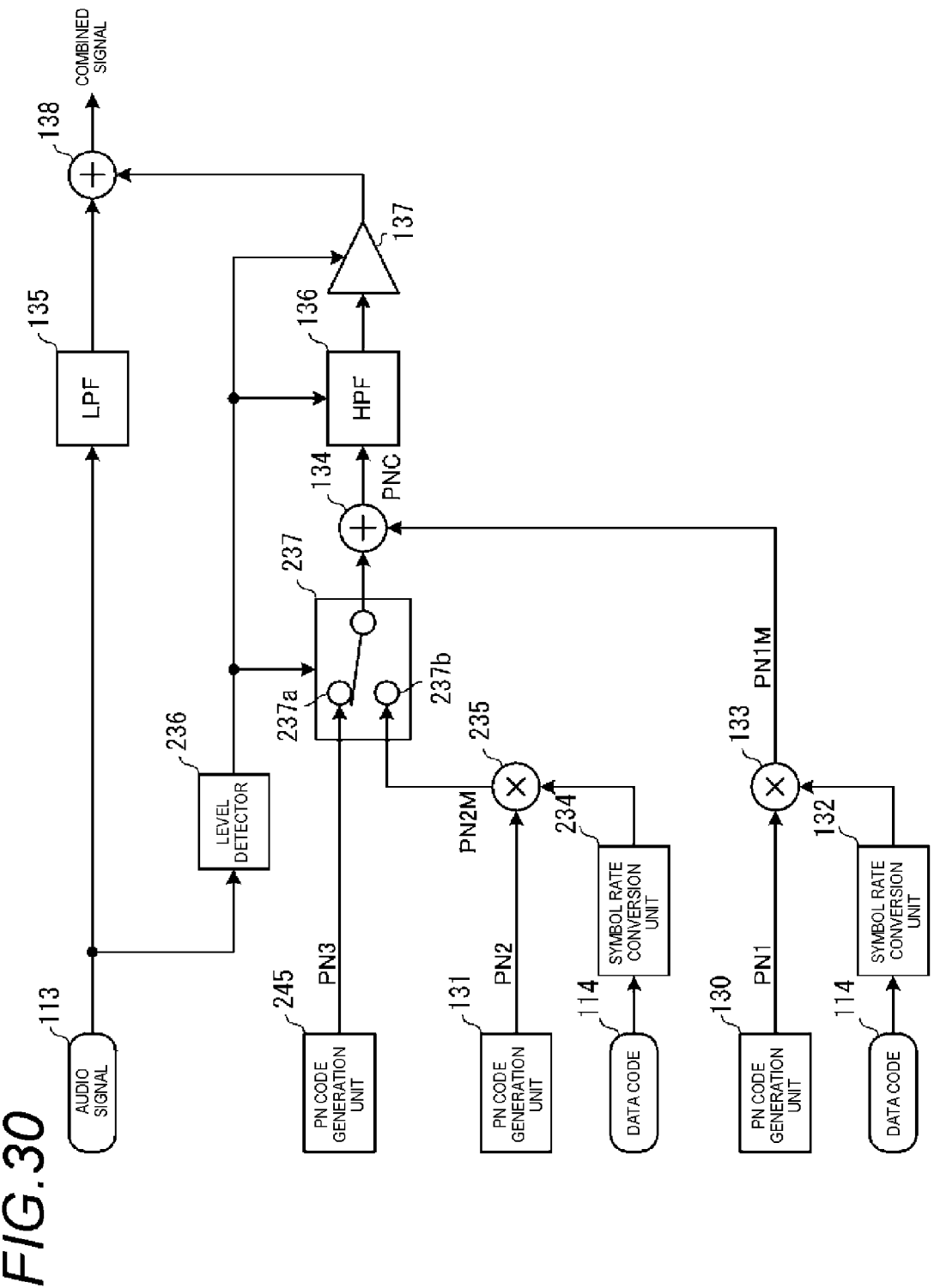
FIG. 30 shows another embodiment of a modulation unit.

FIG. 30 shows a modification of the modulation unit 210 configured as above. In FIG. 30, the same parts as those in the modulation unit 210 of the third embodiment shown in FIG. 26 are represented by the same reference numerals, and description thereof will be omitted. Referring to FIG. 30, the modulation unit 210 includes a third PN code generation unit 245. The PN code generation unit 245 generates a PN code of a different sequence with the same code length as in the first and second PN code generation units 130 and 131.

The third PN code generation unit 245 is connected to the first terminal 237a of the switch 237. Thus, when the switch 237 is switched to the parallel mode, instead of the second PN code, the third PN code is output.

It should suffice that the demodulation unit 221 on the reception side has the configuration of FIG. 27 and sets the filter coefficient in the matched filter 253 of the first demodulation block as the code sequence of the third PN code.

Although in the above-described embodiment, the level detector 236 measures the volume level of the input audio signal 113 and determines whether or not the volume level is equal to or higher than a predetermined threshold value, if the input audio signal is, for example, synchronized with MIDI data or the like, MIDI data may be input, an audio component to be combined may be predicted by relevant data, and a level detection signal may be output. MIDI data is input in advance, such that the volume level can be detected in advance, and no detection delay occurs.

Although in the above-described embodiment, a PN code in an audible frequency band (sampling rate 44.1 kHz) is used, a PN code in a higher frequency band (ultrasonic range) may be used.

In the third embodiment, when the level of the audio signal is equal to or lower than a fixed level, multiple pseudo noise signals are modulated with data codes and the data codes are transmitted in parallel at high speed. When the level of the audio signal is equal to or higher than the fixed level, one pseudo noise signal is not modulated with a data code and is used as a reference pseudo noise signal. The modulation pseudo noise signal and the reference pseudo noise signal are synchronized with each other, obtaining the synchronized peak waveform of the correlation value on the reception side. While the reference pseudo noise signal constantly has a positive phase, the modulation pseudo noise signal is phase-modulated with the data code. Thus, the correlation values are added, making it possible to highlight/cancel the peak value of the correlation value based on the content of the data code. In order to demodulate the data code, it should suffice that only relative position information of the correlation value peak waveform of the modulation pseudo noise signal and the reference pseudo noise signal is used. For example, in any reproduction apparatus, speaker, or transmission path, the transmission characteristic is completely negligible, making it possible to perform robust audio communication.

As described above, in the third embodiment, when the volume level of the audio signal is high, the second pseudo noise signal is set as a reference pseudo noise signal and transmitted along with the modulated first pseudo noise signal, performing robust audio communication. The frequency bands of the pseudo noise signals are limited, such that it is possible to maintain reliability of communication even when the signal waveform is deformed. Thus, the frequency band of the pseudo noise signal is limited to the high-tone range, such that the audience does not easily hear the pseudo noise signal. An audio signal, such as an audio signal pleasant to the audience, is mixed, making it possible to mask data communication using a pseudo noise signal. It is not necessary that the signal level of a pseudo noise signal increases greater than necessary, preventing degradation in sound quality of an audio signal.

When the volume level of an audio signal, such as a musical sound signal, is low, all the multiple pseudo noise signals can be used for data transmission, and data transmission can be performed in parallel. Thus, data can be transmitted at high speed.

Fourth Embodiment

Figure 31:
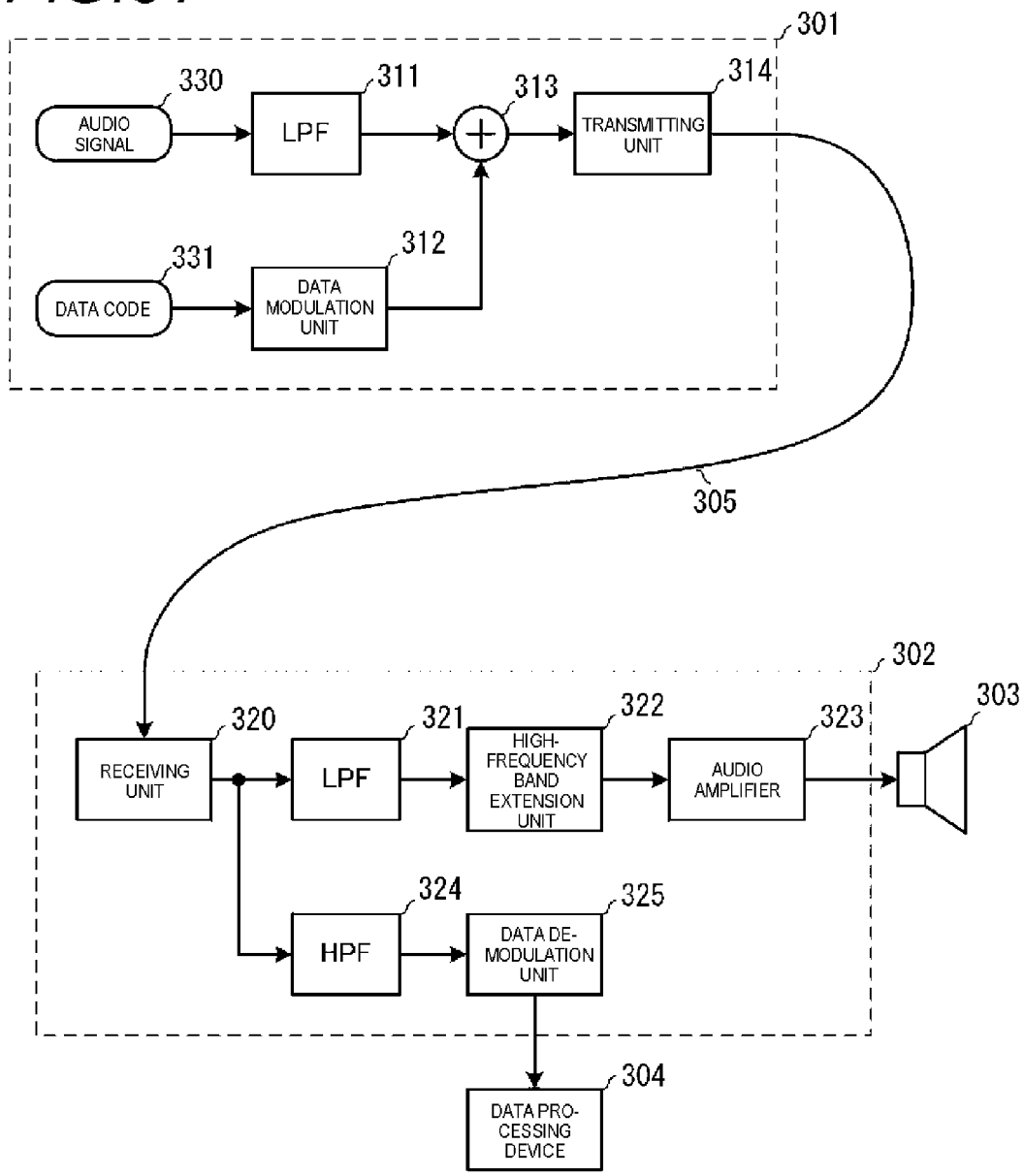
FIG. 31 shows the configuration of an audio communication system according to a fourth embodiment of the invention.

An audio communication system according to a fourth embodiment of the invention will be described with reference to the drawings. FIG. 31 shows the configuration of an audio communication system. The audio communication system includes a transmission device 301 and a reception device 302. The transmission device 301 and the reception device 302 are connected to each other through a transmission line 305. The transmission line 305 may be a digital transmission line or a transmission cable for an analog signal.

The transmission device 301 is a device which transmits a combined signal obtained by superimposing a data signal (modulation signal) modulated with a data code 331 on an audio signal 330 serving as an audio signal. The reception device 302 is a device which receives the combined signal transmitted from the transmission device 301, separates the audio signal and the data signal from each other, emits the audio signal from a speaker 303, and inputs a data code demodulated from the data signal to a data processing device 304. Thus, the speaker 303 and the data processing device 304 are connected to the reception device 302.

Figure 32:
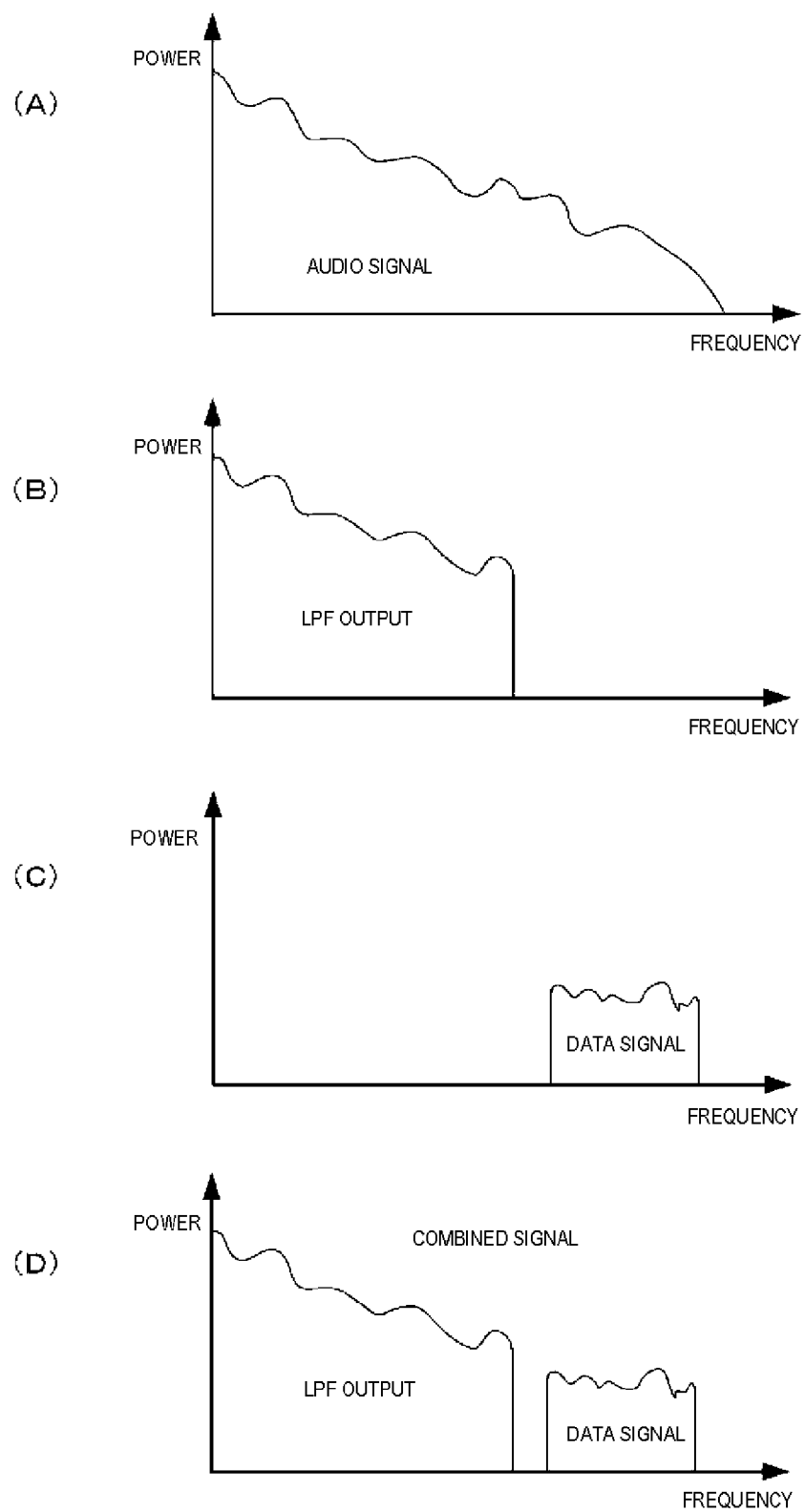
FIG. 32 shows the frequency spectrum of a signal which is processed in each unit of a transmission device.

First, the transmission device 301 will be described. In FIG. 32, (A) to (D) are diagrams showing a frequency spectrum of a signal which is processed by each unit of the transmission device 301. The transmission device 1 includes a low-pass filter (LPF) 311, a data modulation unit 312, an addition unit 313, and a transmitting unit 314.

As shown by (A) in FIG. 32, the audio signal 330 has a frequency spectrum from bass to about 20 kHz. The LPF 311 is a filter which cuts off the high-tone range of the audio signal 330. The LPF 311 cuts off a high-tone range (for example, equal to or higher than 13 kHz), which is scarcely audible to an adult, from the frequency band (for example, equal to or lower than 20 kHz) which can be processed by a general audio signal circuit. The frequency spectrum of the audio signal after the high-tone range is cut off by the LPF 311 is shown by (B) in FIG. 32.

The data modulation unit 312 is a circuit unit which modulates a spread code or a carrier signal with the data code 331 to generate a data signal (modulation signal) modulated with a data code. The data modulation unit 312 generates a data signal which is distributed in the frequency band of the high-tone range (13 kHz to 20 kHz). In FIG. 32, (C) shows the frequency spectrum of a data signal which is distributed in a high-tone range.

The addition unit 313 adds and combines the audio signal with the high-tone range being cut off and the data signal distributed in the high-tone range, and generates a combined signal having a frequency spectrum shown by (D) in FIG. 32. The transmitting unit 314 sends the combined signal to the transmission line 305.

When the transmission line 305 is a transmission cable (for example, a shield line or the like) for an analog audio signal, the transmitting unit 314 is constituted by an analog amplification circuit. When the transmission line 305 is a transmission cable (for example, an optical fiber or a coaxial cable) for a digital audio signal, the transmitting unit 314 is constituted by a low-rate streaming circuit for a digital audio signal. When the transmission line 305 is a LAN cable (for example, an Ethernet (Registered Trademark) cable), the transmitting unit 314 is constituted by a network circuit which transmits and receives packets. In any case, it should suffice that the circuit can process the frequency band of the audio signal.

Figure 33:
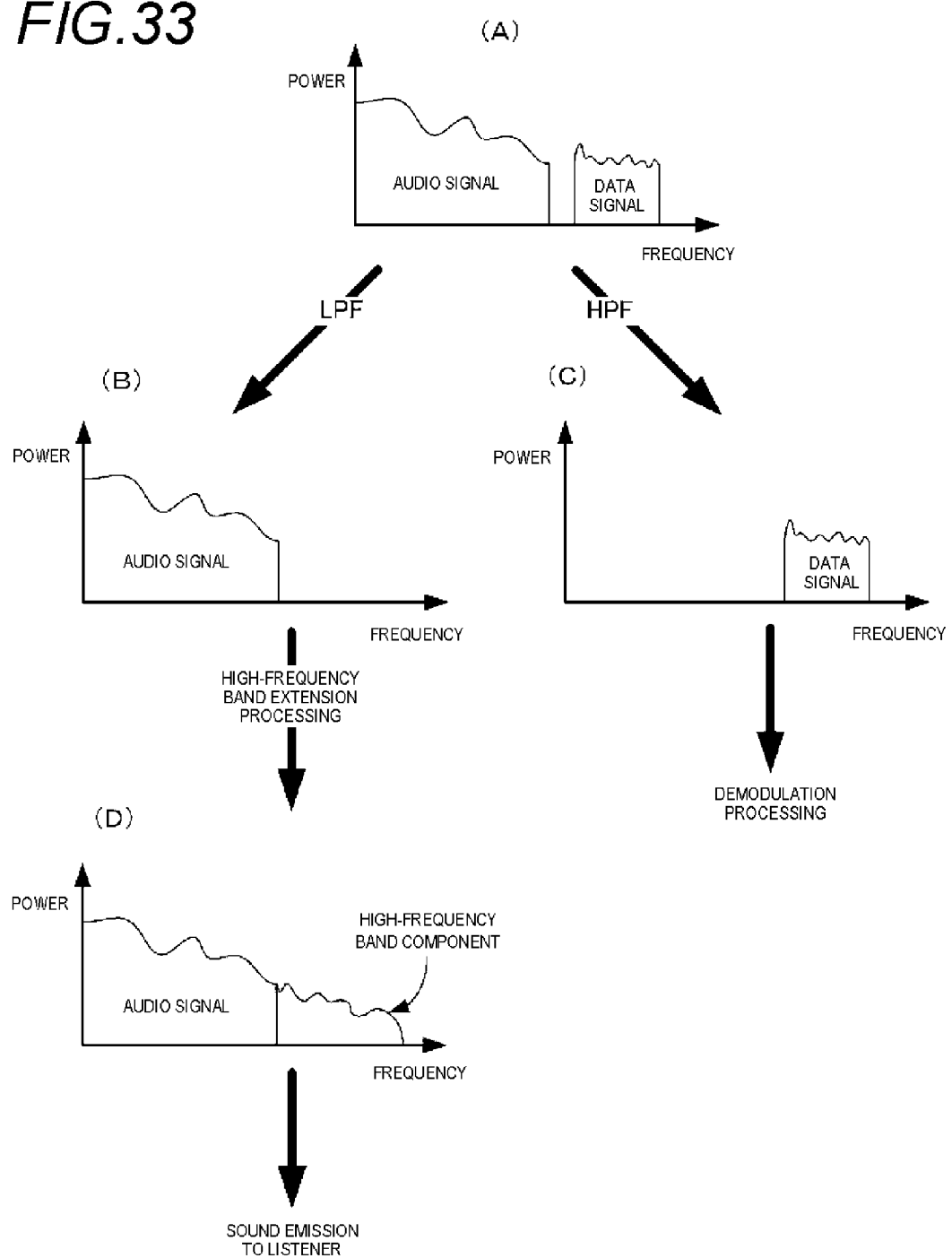
FIG. 33 shows the frequency spectrum of a signal which is processed in each unit of a reception device.

Next, the reception device 302 will be described. In FIG. 33, (A) to (C) are diagrams showing the frequency spectrum of a signal which is processed by each unit of the reception device 302. The reception device 302 includes a receiving unit 320, a low-pass filter (LPF) 321, a high-frequency band extension unit 322, an audio amplifier 323, a high-pass filter (HPF) 324, and a data demodulation unit 325.

The receiving unit 320 is a circuit unit which receives a combined signal transmitted through the transmission line 305. Similarly to the transmitting unit 314, the receiving unit 320 is constituted by a circuit in accordance with the format of the transmission line 305. The combined signal received by the receiving unit 320 has the frequency spectrum shown by (A) in FIG. 33. The combined signal is input to the LPF 321 and the HPF 324. The LPF 321 is a filter having the same characteristic as the LPF 311 of the transmission device 301 (for example, transmits a component equal to or lower than 13 kHz), and extracts only a signal component in a band, in which the audio signal 330 is distributed, from the combined signal received by the receiving unit 320. In FIG. 33, (B) shows the frequency spectrum of a signal component extracted by the LPF 321. The HPF 324 is a filter having a characteristic opposite to the LPFs 311 and 321 (for example, transmits a component equal to or higher than 13 kHz), and extracts only a signal component in a band (high-tone range), in which the data signal (modulation signal) is distributed, from the combined signal received by the receiving unit 320. In FIG. 33, (C) shows the frequency spectrum of a signal component extracted by the HPF 324.

A signal (see (C) in FIG. 33) in a high-tone range extracted by the HPF 324 is a signal including the data signal and is input to the data demodulation unit 325. The data demodulation unit 325 performs processing opposite to the data modulation unit 312 for the input data signal to demodulate the data code. For example, when the data modulation unit 312 performs spread spectrum processing for the data code by means of a spread code, the data demodulation unit 325 detects the peak of mutual correlation by means of the same spread code and demodulates the data code on the basis of the peak value. When the data modulation unit 312 phase-modulates the carrier signal, the data demodulation unit 325 demodulates the data code by means of an orthogonal demodulation circuit or the like. The demodulated data code is output to the data processing device 304 serving as an external apparatus.

An audio signal component (see (B) in FIG. 33) extracted by the LPF 321 is input to the high-frequency band extension unit 322. The high-frequency band extension unit 322 is a processing unit which complements the signal component of the missing high-tone range on the basis of the signal component in the existing mid- and low-tone range.

With regard to the processing method of the high-frequency band extension unit 322, for example, a method described in Japanese Patent No. 4254479, JP-2007-178675A, or the like of this applicant may be used. The method described in Patent Literatures is a method in which the frequency component in the existing mid-tone range is frequency-shifted to the high-tone range to add a pleasant high-tone component to the existing frequency component.

The audio signal after the high-tone range is extended by the high-frequency band extension unit 322 is input to the audio amplifier 323. The audio amplifier 323 amplifies the input audio signal and inputs the amplified audio signal to the speaker 303. Thus, similarly to the mid- and low-tone range, in the high-tone range, an abundant audio component is emitted from the speaker 303.

The cutoff frequency of each of the filters 311, 321, and 324 is not limited to that described above. The modulation method of the data modulation unit 312 and the demodulation method of the data demodulation unit 325 are not limited to those described above. The high-frequency band extension processing in the high-frequency band extension unit 322 is not limited to the above-described method.

With regard to the modulation processing (modulation signal generation processing) and the superimposition processing (audio signal and modulation signal addition combined processing) in the transmission device 301, the method described in each of the first to third embodiments may be used. With regard to the data code demodulation processing in the reception device 302, the method described in each of the first to third embodiments may be used.

Although in the above-described embodiments, an example has been described where the combined signal is transmitted from the transmission device 301 toward the reception device 302 through the wired transmission line 305, the transmission line 305 may be wireless. The invention is not limited to one-to-one transmission, and the transmission device 301 may be, for example, a broadcasting station and the reception device 302 may be a broadcasting receiver.

Instead of the transmission device 301, an audio medium with a combined signal recorded therein may be used. That is, an audio medium with a combined signal recorded therein may be set in the reception device (audio reproduction apparatus) 302 and the receiving unit (reproduction unit) 320 may reproduce the audio medium.

The audio communication system can be applied to, for example, an automatic performance piano system. In this case, the transmission device 301 is a broadcasting station which broadcasts an audio signal, the reception device 302 is a broadcasting receiver which receives broadcasting, and the data processing device 304 is an automatic performance piano.

The automatic performance piano system operates as follows. The transmission device 301 broadcasts music on which automatic performance data is superimposed. The reception device 302 receives broadcasting and reproduces and emits music, and also demodulates automatic performance data superimposed on the audio signal and inputs automatic performance data to the automatic performance piano serving as the data processing device 304. When this happens, the automatic performance piano 304 generates live performance sound in accordance with reproducing music. As described above, according to this audio communication system, it becomes possible to realize automatic performance in accordance with an audio signal even when there is no data transmission path other than audio broadcasting.

According to the invention, it is possible to transmit a data code with superimposed on an audio signal and to reproduce the audio signal with satisfactory sound quality.

The invention claimed is:

1. A modulation device comprising:
a first spread code generation unit configured to generate a first spread code having a predetermined cycle;
an audio signal input unit to which an audio signal is input;
a low-pass filter configured to cut off a high band component of the input audio signal equal to or higher than a cutoff frequency;
a first modulation unit configured to phase-modulate the first spread code in each cycle on the basis of data code; and
a combining unit configured to combine the audio signal, with the high band component cut off, with a modulation signal that has been generated on the basis of the phase-modulated first spread code and distributed in a frequency range higher than cutoff frequency to output a combined signal.

2. The modulation device according to claim 1, further comprising:
a conversion unit configured to convert the first spread code phase-modulated by the first modulation unit to a differential code; and
a multiplication unit configured to multiply the differential code by a carrier signal to shift the differential code to the frequency range,
wherein the combining unit combines the audio signal with the shifted differential code as the modulation signal.

3. The modulation device according to claim 2, further comprising:
an up-sampling unit configured to up-sample the differential code converted by the conversion unit,
wherein the multiplication unit multiplies the up-sampled differential code by the carrier signal.

4. The modulation device according to claim 1, further comprising:
a second spread code generation unit configured to generate a second spread code, which is synchronized with the first spread code and has a code sequence different from that of the first spread code,
wherein the combining unit combines the audio signal with a combined spread code as the modulation signal, the combined spread code being a combination of the phase-modulated first spread code and the second spread code.

5. The modulation device according to claim 4, further comprising:
a high-pass filter configured to cut off a frequency component lower than a cutoff frequency of the combined spread code,
wherein the combining unit combines the audio signal with a combined spread code with the frequency component being cut as the modulation signal.

6. The modulation device according to claim 4, wherein the second spread code is a signal having the same cycle as that of the first spread code.

7. The modulation device according to claim 1, wherein:
the data code is a signal constituted by a binary bit string, and
the first modulation unit rotates the phase of the first spread code by 0 degrees or 180 degrees in accordance with the value of the data code.

8. The modulation device according to claim 1, further comprising:
a sound emission unit which emits the combined signal output from the combining unit into a medium.

9. A modulation device comprising:
a first spread code generation unit configured to generate a first spread code having a predetermined cycle;
an audio signal input unit to which an audio signal is input;
a first modulation unit configured to phase-modulate the first spread code in each cycle on the basis of data code; and
a combining unit configured to combine the audio signal with a modulation signal that has been generated on the basis of the phase-modulated first spread code and distributed in a frequency range higher than a predetermined frequency to output a combined signal;
a second spread code generation unit configured to generate a second spread code, which is synchronized with the first spread code and has a code sequence different from the first spread code;
a level detection unit configured to detect the volume level of the audio signal input to the audio signal input unit;
a second modulation unit configured to phase-modulate and output the second spread code in each cycle on the basis of the data code when the volume level of the audio signal is equal to or lower than a predetermined threshold value and configured to output the second spread code as is when the volume level of the audio signal is equal to or higher than the predetermined threshold value; and a high-pass filter configured to cut off a frequency component equal to or lower than a cutoff frequency of a combined spread code obtained by combining the first spread code output from the first modulation unit and the second spread code output from the second modulation unit, wherein the high-pass filter is configured to set the cutoff frequency to a first value when the volume level of the audio signal is equal to or lower than the predetermined threshold value, and set the cutoff frequency to a second value higher than the first value when the volume level of the audio signal is equal to or higher than the predetermined threshold value, wherein the combining unit combines the audio signal with the combined spread code with the frequency component equal to or lower than the cutoff frequency being cut as the modulation component.

10. A demodulation device comprising:
an audio signal input unit to which a combined signal is input, the combined signal being a combination of an audio signal with a modulation signal, wherein the audio signal has no frequency component higher than a predetermined frequency and the modulation signal has been generated on the basis of a first spread code having a cycle phase-modulated in each cycle on the basis of a data code and has been distributed in a frequency range higher than the predetermined frequency;

a high-pass filter configured to cut off a frequency component equal to or lower than a cutoff frequency of the combined signal to extract a component of the modulation signal; and a code determination unit configured to decode the data code combined in the audio signal on the basis of an analysis result of the extracted component of the modulation signal.

11. The demodulation device according to claim 10, wherein:
the modulation signal is a signal obtained by multiplying a differential code converted from the phase-modulated first spread code by a carrier signal, and
the demodulation device further comprises:
a delay detection unit configured to carry out delay detection of the modulation signal in the delay time for one chip of the first spread code and to convert the differential code to a decoded code waveform; and
a correlation detection unit configured to detect a correlation value between the decoded code waveform and the first spread code, and
the code determination unit decodes the data code on the basis of the polarity of a peak of the detected correlation value.

12. The demodulation device according to claim 10, further comprising:
a sound collection unit which is configured to emit sound propagating through a medium and supply the emitted sound as the audio signal to the audio signal input unit.

13. The demodulation device according to claim 10, wherein:
the modulation signal is generated based on a signal obtained by up-sampling a differential code by N times, wherein the differential code is converted from the phase-modulated first spread code, and
the code determination unit includes:

a delay unit configured to delay the modulation signal by a delay time corresponding to N samples of the first spread code;
a multiplier configured to multiply a sample output from the high-pass filter by a sample output from the delay unit;
a low-pass filter configured to receive a signal output from the multiplier; and
a correlation detection unit that includes an FIR filter having the first spread code as a coefficient,
wherein the correlation detection unit is configured to carry out a convolution operation of an output signal from the low-pass filter and the first spread code, and output a correlation value.

14. A demodulation device comprising:
a combined signal input unit to which an audio signal is input, the combined signal being a combination of an audio signal and a modulation signal, which has been generated on the basis of a first spread code having a cycle phase-modulated in each cycle on the basis of a data code and has been distributed in a frequency range higher than a predetermined frequency;
a high-pass filter configured to cut off a frequency component equal to or lower than a cutoff frequency of the combined signal to extract a component of the modulation signal; and
a code determination unit configured to decode the data code combined in the audio signal on the basis of an analysis result of the extracted component of the modulation signal,
wherein the phase-modulated first spread code and a second spread code, which is synchronized with the first spread code and has a code sequence different from the first spread code, are combined in the modulation signal,
wherein the demodulation device further comprises:
a first correlation detection unit configured to detect a first correlation value, which is a correlation value of the modulation signal with respect to the first spread code before phase modulation;
a second correlation detection unit configured to detect a second correlation value, which is a correlation value of the modulation signal with respect to the second spread code;
an addition unit configured to add the first correlation value and the second correlation value to output a combined correlation value; and
a peak value detection unit configured to detect a peak value of the combined correlation value in each cycle of the first spread code, and
wherein the code determination unit decodes the data code on the basis of the magnitude of the peak value of the combined correlation value detected by the peak value detection unit.

15. A demodulation device comprising:
an audio signal input unit that inputs an audio signal, the audio signal being obtained by combining a plurality of spread codes, which are synchronized with each other and have different code sequences;
a mode determination unit configured to determine a mode from a reference mode in which a spread code separated from the input audio signal includes a reference spread code, which is not phase-modulated by a data code, and a parallel mode in which the spread code excludes the reference spread code;
a first demodulation unit configured to operate in the parallel mode; and a second demodulation unit configured to operate in the reference mode, wherein the first demodulation unit detects respective correlation values of the audio signal with respect to the plurality of spread codes, and demodulates the data code on the basis of the peak of each of the correlation values, wherein the second demodulation unit includes:

a first correlation detection unit configured to detect a first correlation value, which is a correlation value of the audio signal with respect to a spread code phase-modulated by the data code;

a second correlation detection unit configured to detect a second correlation value, which is a correlation value of the audio signal with respect to the reference spread code;

an addition unit configured to add the first correlation value and the second correlation value to output a combined correlation value;

a peak detection unit configured to detect a peak value of the combined correlation value in each cycle of the spread code phase-modulated by the data code; and a code determination unit configured to decode the data code combined in the audio signal on the basis of the magnitude of the peak value detected by the peak value detection unit.

16. The demodulation device according to claim 15, wherein the mode determination unit determines the mode from the reference mode and the parallel mode on the basis of whether or not the input audio signal is equal to or higher than a predetermined level.

17. The demodulation device according to claim 15, further comprising:

a sound collection unit which is configured to emit sound propagating through a medium and supply the emitted sound as the audio signal to the audio signal input unit.

18. An audio signal reproduction apparatus comprising:

a demodulation device comprising:

an audio signal input unit to which a combined signal is input, the combined signal being a combination of an audio signal with a modulation signal, wherein the audio signal has no frequency component higher than a predetermined frequency and has been generated on the basis of a first spread code having a cycle phase-modulated in each cycle on the basis of a data code and has been distributed in a frequency range higher than the predetermined frequency;

a high-pass filter configured to cut off a frequency component equal to or lower than a cutoff frequency of the combined signal to extract a component of the modulation signal; and a code determination unit configured to decode the data code combined in the audio signal on the basis of an analysis result of the extracted component of the modulation signal;

a low-pass filter configured to cut off a frequency component equal to or higher than a predetermined frequency of the combined signal and extracts the audio signal; and a high-frequency band extension unit configured to complement a signal component equal to or higher than the predetermined frequency to the extracted audio signal.

19. The audio signal reproduction apparatus according to claim 18, wherein:

the modulation signal is generated based on a signal obtained by up-sampling a differential code by N times, wherein the differential code is converted from the phase-modulated first spread code, and the code determination unit includes:

a delay unit configured to delay the modulation signal by a delay time corresponding to N samples of the first spread code;

a multiplier configured to multiply a sample output from the high-pass filter by a sample output from the delay unit;

a low-pass filter configured to receive a signal output from the multiplier; and a correlation detection unit that includes an FIR filter having the first spread code as a coefficient, wherein the correlation detection unit is configured to carry out a convolution operation of an output signal from the low-pass filter and the first spread code, and output a correlation value.

20. An audio signal reproduction apparatus comprising:

a demodulation device comprising:

an audio signal input unit that inputs an audio signal, the audio signal being obtained by combining a plurality of spread codes, which are synchronized with each other and have different code sequences;

a mode determination unit configured to determine a mode from a reference mode in which a spread code separated from the input audio signal includes a reference spread code, which is not phase-modulated by a data code, and a parallel mode in which the spread code excludes the reference spread code;

a first demodulation unit configured to operate in the parallel mode; and a second demodulation unit configured to operate in the reference mode, wherein the first demodulation unit detects respective correlation values of the audio signal with respect to the plurality of spread codes, and demodulates the data code on the basis of the peak of each of the correlation values, and wherein the second demodulation unit includes:

a first correlation detection unit configured to detect a first correlation value, which is a correlation value of the audio signal with respect to a spread code phase-modulated by the data code;

a second correlation detection unit configured to detect a second correlation value, which is a correlation value of the audio signal with respect to the reference spread code;

an addition unit configured to add the first correlation value and the second correlation value to output a combined correlation value;

a peak detection unit configured to detect a peak value of the combined correlation value in each cycle of the spread code phase-modulated by the data code; and a code determination unit configured to decode the data code combined in the audio signal on the basis of the magnitude of the peak value detected by the peak value detection unit;

a low-pass filter configured to cut off a frequency component equal to or higher than a predetermined frequency of the combined signal and extracts the audio signal; and a high-frequency band extension unit configured to complement a signal component equal to or higher than the predetermined frequency to the extracted audio signal.

* * * * *